US012657480B2

(12) United States Patent
Ezrielev et al.

(10) Patent No.: US 12,657,480 B2
(45) Date of Patent: Jun. 16, 2026

(54) SYSTEM AND METHOD FOR REDUCTION OF DATA TRANSMISSION BY INFERENCE OPTIMIZATION AND DATA RECONSTRUCTION

(71) Applicant: Dell Products L.P., Round Rock, TX (US)

(72) Inventors: Ofir Ezrielev, Be'er Sheva (IL); Jehuda Shemer, Kfar Saba (IL)

(73) Assignee: Dell Products L.P., Round Rock, TX (US)

( * ) Notice: Subject to any disclaimer, the term of this patent is extended or adjusted under 35 U.S.C. 154(b) by 1088 days.

(21) Appl. No.: 17/726,268

(22) Filed: Apr. 21, 2022

(65) Prior Publication Data

US 2023/0342631 A1 Oct. 26, 2023

(51) Int. Cl.
*G06N 5/022* (2023.01)
*G06N 5/04* (2023.01)

(52) U.S. Cl.
CPC ............... *G06N 5/022* (2013.01); *G06N 5/04* (2013.01)

(58) Field of Classification Search
CPC .......... G06N 5/022; G06N 5/04; G06N 3/045; G06N 3/063; G06N 3/08; G06N 20/00
See application file for complete search history.

(56) References Cited

U.S. PATENT DOCUMENTS 11,526,745 B2 * 12/2022 Sheller ................... G06N 3/063
2016/0026520 A1 1/2016 Bouta et al.

2019/0044786 A1 2/2019 Wouhaybi et al.
2020/0219015 A1 * 7/2020 Lee ........................ G06F 18/214
2021/0376853 A1 12/2021 De et al.
2022/0318687 A1 * 10/2022 Rajagopalan ......... G06F 9/4881
2023/0259740 A1 * 8/2023 Kulkarni .............. G06N 3/0495
706/20

OTHER PUBLICATIONS

Lewandowski et al., "Classifier-Based Data Transmission Reduction in Wearable Sensor Network for Human Activity Monitoring", Sensors 2021, 21, 85. <https://dx.doi.org/10.3390/s21010085>, Dec. 25, 2020, 22 pages (Year: 2020).

(Continued)

*Primary Examiner* — Mariela Reyes
*Assistant Examiner* — Evel Honore
(74) *Attorney, Agent, or Firm* — WOMBLE BOND DICKINSON (US) LLP

(57) ABSTRACT

Methods and systems for managing data collection are disclosed. To manage data collection, a system may include a data aggregator and a data collector. The data aggregator may utilize complex inference models to predict the future operation of the data collector, while the data collector may host simpler inference models. The data collector may access inferences from the complex models by obtaining a difference between complex and simple inferences from the data aggregator and locally reconstructing the complex differences. To reduce data transmission, the data collector may transmit a data difference (e.g., a reduced-size representation of a measurement) to the data aggregator using the reconstructed complex inferences. The data aggregator may reconstruct data from the data collectors using the data difference from the data collector and inferences from the complex inference model.

20 Claims, 22 Drawing Sheets

START

Obtain aggregator inference model (AIM) inference
Operation 307

Obtain twin inference model (TIM) inference
Operation 308

Obtain inference difference
Operation 309

Transmit inference difference to data collector
Operation 310

Obtain data difference
Operation 311

Reconstruct data from data collector
Operation 312

Discard AIM inferences, TIM inferences, inference differences, and data differences
Operation 313

FIG 3D

(56) References Cited

OTHER PUBLICATIONS

Cui et al., "Classification of data aggregation functions in wireless sensor networks", Computer Networks, vol. 178, 107342, <https://doi.org/10.1016/j.comnet.2020.107342>, 13 pages (Year: 2020).

Liazid et al., "An improved adaptive dual prediction scheme for reducing data transmission in wireless sensor networks", Wireless Networks, 25:3545-3555, <https://doi.org/10.1007 /s11276-019-01950-7>, Feb. 2, 2019, 11 pages (Year: 2019).

Chen et al., "Online Model-Driven Data Acquisition for Wireless Sensor Networks", 2015 IEEE Wireless Communications and Networking Conference (WCNC). IEEE, 2015, 6 pages (Year: 2015).

Zhang et al., "Lightweight Self-Adapting Linear Prediction Algorithms for Wireless Sensor Networks", IEEE Sensors Journal, vol. 15, No. 5, May 2015, pp. 3050-3058 (Year: 2014).

Jain et al., "A Novel Data Prediction Technique Based on Correlation for Data Reduction in Sensor Networks", Proceedings of International Conference on Artificial Intelligence and Applications: ICAIA 2020. Springer Singapore, 2021, 12 pages (Year: 2020).

Pearl, Judea. "Causal inference in statistics: An overview." Statistics surveys 3 (2009): 96-146. https://projecteuclid.org/journals/statistics-surveys/volume-3/issue-none/Causal-inference-in-statistics-An-overview/10.1214/09-SS057.short.

Xie, Yaochen, et al. "Self-supervised learning of graph neural networks: A unified review." IEEE Transactions on Pattern Analysis and Machine Intelligence (2022). https://ieeexplore.ieee.org/abstract/document/9764632/.

Kumar, Manoj, et al. "Genetic algorithm: Review and application." Available at SSRN 3529843 (2010). https://papers.ssm.com/sol3/papers.cfm?abstract_id=3529843.

Matsubara et al., "Bottle Fit: Learning Compressed Representations in Deep Neural Networks for Effective and Efficient Split Computing", arXiv:2201.02693v2 [cs.LG], Apr. 14, 2022 (Year: 2022) (10 pages).

Zhang et al., "Compressive Sensing and Autoencoder Based Compressed Data Aggregation for Green IoT Networks", 2019 IEEE Global Communications Conference (GLOBECOM) (Year: 2019) (6 pages).

Ghosh et al., "Deep Learning: Edge-Cloud Data Analytics for IoT", 2019 IEEE Canadian Conference of Electrical and Computer Engineering (CCECE) (Year: 2019) (7 pages).

Niu et al., "An Adaptive Device-Edge Co-Inference Framework Based on Soft Actor-Critic", arXiv:2201.02968v1 [cs.LG], Jan. 9, 2022 (Year: 2022) (7 pages).

Fu et al., "Secure Data Storage and Searching for Industrial IoT by Integrating Fog Computing and Cloud Computing", IEEE Transactions on Industrial Informatics, vol. 14, No. 10, Oct. 2018, Date of publication Jan. 15, 2018; (Year: 2018) (10 pages).

Li et al., "Deep Learning for Smart Industry: Efficient Manufacture Inspection System With Fog Computing" IEEE Transactions on Industrial Informatics, vol. 14, No. 10, Oct. 2018, Date of publication Jun. 1, 2018 (Year: 2018) (9 pages).

Lewandowski, M.; Płaczek, B.; Bernas, M.; Classifier-Based Data Transmission Reduction in Wearable Sensor Network for Human Activity Monitoring. Sensors 2021, 21, 85. https://doi.org/10.3390/s21010085.

Le Borgne, Yann-Aël & Santini, Silvia & Bontempi, Gianluca. (2007). Adaptive model selection for time series prediction in wireless sensor networks. Signal Processing. 87. 3010-3020. 10.1016/j.sigpro.2007.05.015.

Ankur Jain, Edward Y. Chang, Yuan-Fang Wang; Adaptive stream resource management using Kalman Filters. SIGMOD '04: Proceedings of the 2004 ACM SIGMOD international conference on Management of data Jun. 2004 pp. 11-22 https://doi.org/10.1145/1007568.1007573.

X. Feng, X. Zhenzhen, Y. Lin, S. Weifeng and L. Mingchu, "Prediction-based data transmission for energy conservation in wireless body sensors," 2010 The 5th Annual ICST Wireless Internet Conference (WICON), 2010, pp. 1-9.

Tulone, Daniela & Madden, Samuel. (2006). An energy-efficient querying framework in sensor networks for detecting hode similarities. 191-300. 10.1145/1164717.1164768.

Lu, Qing & Jiang, Weiwen & Xu, Xiaowei & Shi, Yiyu & Hu, Jingtong. (2019). On Neural Architecture Search for Resource-Constrained Hardware Platforms.

"Detecting data drift on data sets," Web page <https://docs.microsoft.com/en-us/azure/machine-learning/how-to-monitor-datasets?tabs=python>, Nov. 10, 2021, retrieved from Internet Archive Wayback Machine <https://web.archive.org/web/20210420083010/https://docs.microsoft.com/en-us/azure/machine-learning/how-to-monitor-datasets?tabs=python> on Apr. 27, 2022).

* cited by examiner

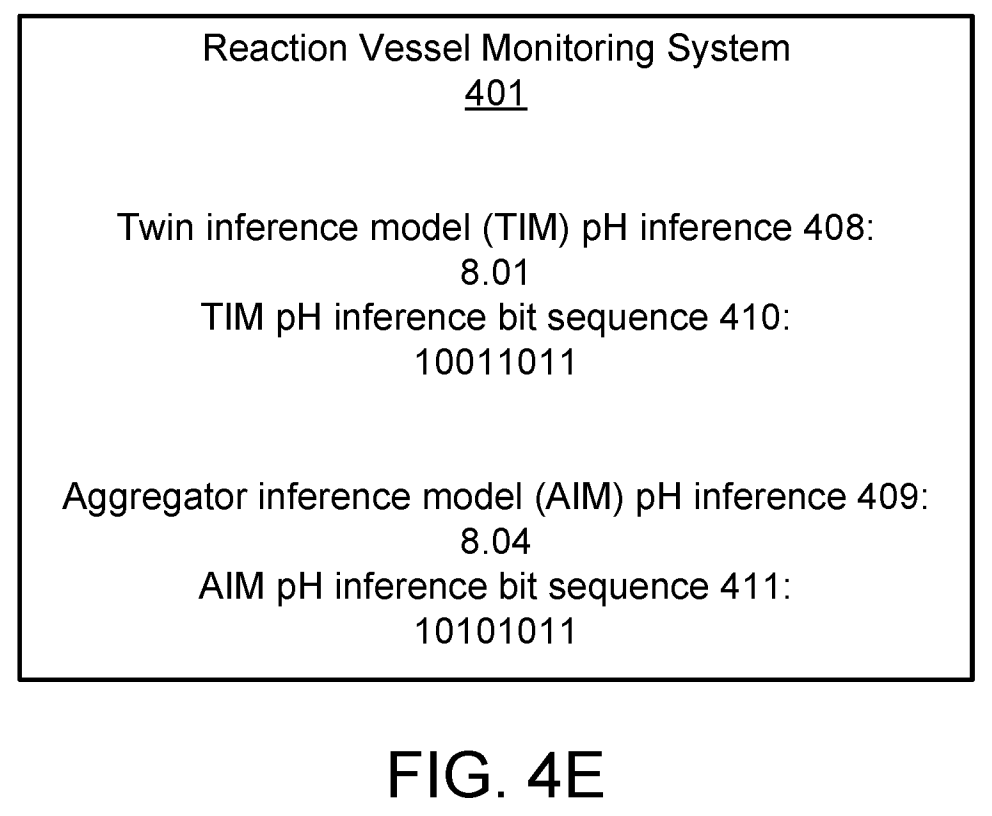

Reaction Vessel Monitoring System
401

Twin inference model (TIM) pH inference 408:
8.01

TIM pH inference bit sequence 410:
10011011

Aggregator inference model (AIM) pH inference 409:
8.04

AIM pH inference bit sequence 411:
10101011

FIG. 4E

SYSTEM AND METHOD FOR REDUCTION OF DATA TRANSMISSION BY INFERENCE OPTIMIZATION AND DATA RECONSTRUCTION

FIELD

Embodiments disclosed herein relate generally to data collection. More particularly, embodiments disclosed herein relate to systems and methods to limit the transmission of data over a communication system during data collection.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

FIGS. 4A-4M show block diagrams illustrating a system in accordance with an embodiment over time.

DETAILED DESCRIPTION

Figure 1:
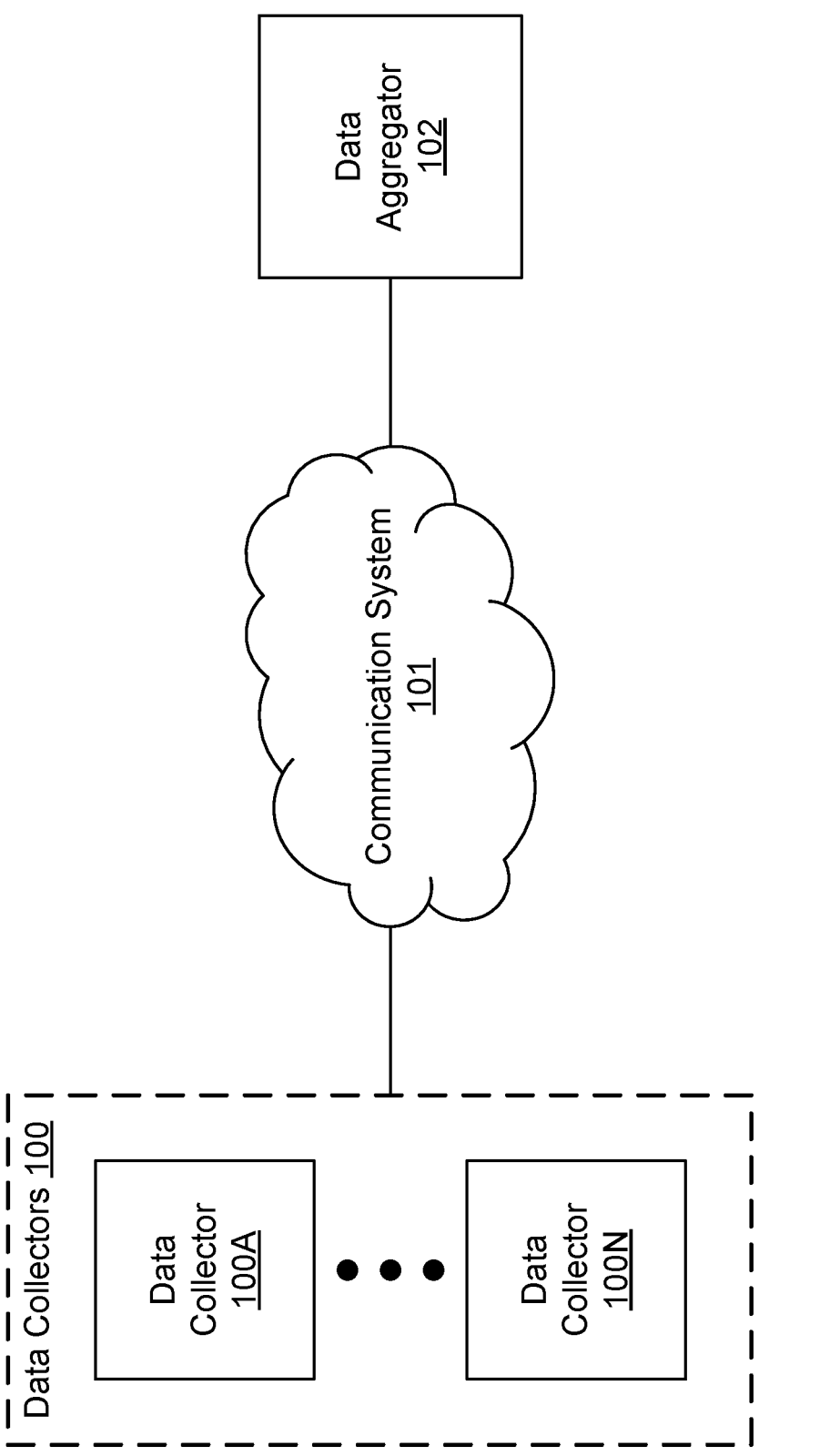
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

In general, embodiments disclosed herein relate to methods and systems for managing data collection in a distributed environment. To manage data collection, the system may include a data aggregator and a data collector. The data aggregator may utilize inference models to predict data based on future measurements performed by data collectors throughout a distributed environment without having access to the measurements. The data aggregator may host a copy of a twin inference model (TIM) and a second (more accurate) aggregator inference model (AIM), both trained to predict data from the same sources. The data collector may host a second identical copy of the TIM. Therefore, the data aggregator and data collector may have access to identical sets of inferences from the TIM. In order to minimize computational overhead at the data collector, the data collector may not host a copy of the AIM.

To obtain the AIM and TIM, training data may be used to train the AIM and TIM to predict future measurements performed by the data collectors. The data collectors may include any type and quantity of data collectors including, for example, temperature data collectors, pH data collectors, humidity data collectors, etc. Therefore, the disclosed system may be broadly applicable to a wide variety of data collectors that may generate various types and quantities of measurements.

In order to attempt to reduce data transmission, the data collector may access the more accurate AIM inference without any AIM inferences being transmitted over a communication system. In order to do this, the data aggregator may generate an inference difference, an inference difference being a reduced-size representation of an inference based on (i) an AIM inference obtained by AIM hosted by the data aggregator and (ii) a TIM inference obtained by the copy of the TIM hosted by the data aggregator. The data aggregator may transmit this inference difference to the data collector.

The data collector may use this inference difference and the TIM inference obtained by the copy of the TIM hosted by the data collector to reconstruct the AIM inference. This AIM inference may allow the data collector to obtain a data difference, a data difference being a reduced-size representation of a measurement performed by a data collector. The data collector may obtain this data difference using (i) the reconstructed AIM inference obtained by the data collector and (ii) a measurement performed by the data collector. The data collector may transmit this data difference to the data aggregator as a method of performing data collection.

The data aggregator may reconstruct data using (i) the data difference obtained from the data collector and (ii) the AIM inference obtained by the AIM hosted by the data aggregator. The AIM inference obtained by the data aggregator may be identical to the reconstructed AIM inference utilized by the data collector to obtain the data difference. Therefore, the data aggregator may access the exact measurement performed by the data collector without measurements being transmitted over a communication system. Consequently, data transmission may be reduced, communication system bandwidth may be conserved, and energy consumption of the devices may be reduced throughout the system.

In an embodiment, a method for managing data collection in a distributed environment where data is collected in a data aggregator of the distributed environment and from at least a data collector operably connected to the data aggregator via a communication system is provided The method may include obtaining, by the data aggregator, an inference difference, the inference difference being based on: a first inference generated by an aggregator inference model, the first inference being intended to match data based on measurements performed by the data collector, and a second inference generated by a twin inference model, the second inference being intended to match data based on measurements performed by the data collector; obtaining, from the data collector, a data difference, the data difference being based on: data obtained via a measurement performed by the data collector, and a reconstructed inference, the reconstructed inference being generated by the data collector and matching the first inference generated by the aggregator inference model; reconstructing, by the data aggregator, the data using the data difference and the first inference generated by the data aggregator, the first inference being intended to match the data; performing an action set based at least in part on the reconstructed data, the action set comprising one or more actions to be performed based on the data obtained by the measurement performed by the data collector, and while the data aggregator does not have access to the data obtained by the data collector.

The method may also include providing, to the data collector, a copy of the inference difference prior to obtaining the data difference, wherein the data difference is obtained by the data aggregator prior to the data collector being provided with the first inference and the second inference.

The twin inference model hosted by the data aggregator is a copy of a second twin inference model hosted by the data collector, and the reconstructed inference being based on the inference difference generated by the data aggregator, wherein the inference difference is usable to obtain the first inference based on the second inference to which the data collector has access via the copy of the second twin inference model.

The method may also include making a determination that the data difference falls below a threshold; and based on that determination: treating an aggregator inference model as being accurate, the aggregator inference model being implemented by the data aggregator, and the aggregator inference model being used to obtain the first inference.

The method may also include making a determination that the data difference falls outside of a threshold; and based on that determination: treating an aggregator inference model as being inaccurate, the aggregator inference model being implemented by the data aggregator, and the aggregator inference model being used to obtain the first inference.

The method may also include when the aggregator inference model is determined as being inaccurate: updating the aggregator inference model using training data, the training data comprising a portion of data obtained via a series of measurements performed by the data collector.

The method may also include prior to obtaining the inference difference: obtaining, by the data aggregator, an aggregator inference model using training data obtained, at least in part, from the data collector.

The method may also include prior to obtaining the inference difference: obtaining, by the data aggregator, a twin inference model using the training data; and distributing, by the data aggregator, a copy of the twin inference model to the data collector.

The aggregator inference model is not provided to the data collector prior to the data difference being obtained by the data aggregator.

The twin inference model consumes fewer computing resources than the aggregator inference model during operation.

A value of the data difference decreases as accuracy of the aggregator inference model increases, and the value of the data difference increases as the accuracy of the aggregator inference model decreases.

A quantity of bits necessary to communicate the data difference via the communication system decreases as the accuracy of the aggregator inference model increases.

The action set is not based on any data from measurements performed by the data collector that is transmitted via the communication system to the data aggregator.

The measurement is performed using a sensor that measures a characteristic of an ambient environment proximate to the data collector, the ambient environment proximate to the data collector being different from an ambient environment proximate to the data aggregator.

The one or more actions are triggered to be performed based on the ambient environment proximate to the data collector and are independent from the ambient environment proximate to the data aggregator.

A non-transitory media may include instructions that when executed by a processor cause the computer-implemented method to be performed.

A data processing system may include the non-transitory media and a processor, and may perform the computer-implemented method when the computer instructions are executed by the process.

Turning to FIG. 1, a block diagram illustrating a system in accordance with an embodiment is shown. The system shown in FIG. 1 may provide computer-implemented services that may utilize data aggregated from various sources throughout a distributed environment.

The system may include data aggregator 102. Data aggregator 102 may provide all, or a portion, of the computer-implemented services. For example, data aggregator 102 may provide computer-implemented services to users of data aggregator 102 and/or other computing devices operably connected to data aggregator 102. The computer-implemented services may include any type and quantity of services which may utilize, at least in part, data aggregated from a variety of sources (e.g., data collectors 100) within a distributed environment.

For example, data aggregator 102 may be used as part of a control system in which data that may be obtained by data collectors 100 is used to make control decisions. Data such as temperatures, pressures, etc. may be collected by data collectors 100 and aggregated by data aggregator 102. Data aggregator 102 may make control decisions for systems using the aggregated data. In an industrial environment, for example, data aggregator 102 may decide when to open and/or close valves using the aggregated data. Data aggregator 102 may be utilized in other types of environments without departing from embodiments disclosed herein.

To facilitate data collection, the system may include one or more data collectors 100. Data collectors 100 may include any number of data collectors (e.g., 100A-100N). For example, data collectors 100 may include one data collector (e.g., 100A) or multiple data collectors (e.g., 100A-100N) that may independently and/or cooperatively provide data collection services.

For example, all, or a portion, of data collectors 100 may provide data collection services to users and/or other computing devices operably connected to data collectors 100. The data collection services may include any type and quantity of services including, for example, temperature data collection, pH data collection, humidity data collection, etc. Different systems may provide similar and/or different data collection services.

To aggregate data from data collectors 100, some portion and/or representations of data collected by data collectors 100 may be transmitted across communication system 101 to data aggregator 102 (and/or other devices). The transmission of large quantities of data over communication system 101 may have undesirable effects on the communication system 101, data aggregator 102, and/or data collectors 100. For example, transmitting data across communication system 101 may consume network bandwidth and increase the energy consumption of data collectors 100 used for data transmission. Additionally, in some cases, it may be more desirable to transmit data in certain directions between components due to communication demands within the system.

In general, embodiments disclosed herein may provide methods, systems, and/or devices for managing data collection in a distributed environment. To manage data collection in a distributed environment, a system in accordance with an embodiment may limit the transmission of data between components of the system while ensuring that all components that need access to the data to provide their respective functions are likely to have access to accurate data (e.g., such as the data based on measurements performed by data collectors 100). By limiting the transmission of data, communication bandwidth of the system of FIG. 1 may be preserved, energy consumption for data transmission may be reduced, etc.

To limit the transmission of data, data collectors 100 may (i) obtain a portion of data from a data aggregator and (ii) generate and transmit only a data difference between the portion of data and a measurement rather than the data itself, the difference may be a reduced-size representation of data which may be used by the data aggregator to reconstruct the data without having access to the data.

To provide its functionality, data aggregator 102 may (i) prepare for data transmission by obtaining and training inference models to predict data from data collectors, (ii) obtain data from data collectors via data reconstruction (discussed in greater detail below with respect to FIG. 3C), and (iii) perform corrective action if needed to improve future predictions of data made by the inference models by updating the inference models. By doing so, data aggregator 102 may perform data collection without obtaining (all of, or a portion thereof) data based on a series of measurements performed by data collectors 100 and, therefore, reduce data transmission.

When performing its functionality, data aggregator 102 may perform all, or a portion, of the methods and/or actions shown in FIGS. 3A-3D.

To provide its functionality, data collectors 100 may (i) obtain data based on a measurement of interest to the data aggregator or other entity, (ii) obtain an inference difference (discussed in greater detail below with respect to FIG. 3E) from the data aggregator, (iii) reconstruct an inference made by the data aggregator and on which the inference difference is based using a twin inference model hosted by the data collector and data aggregator, (iii) generate a data difference, a difference being a reduced-size representation of the data, using the reconstructed inference, and (iii) transmit the data difference to data aggregator 102. By doing so, data collectors 100 may transmit a reduced quantity of data to data aggregator 102 for data collection purposes thereby decreasing network bandwidth consumption over communication system 101.

Figure 3A:
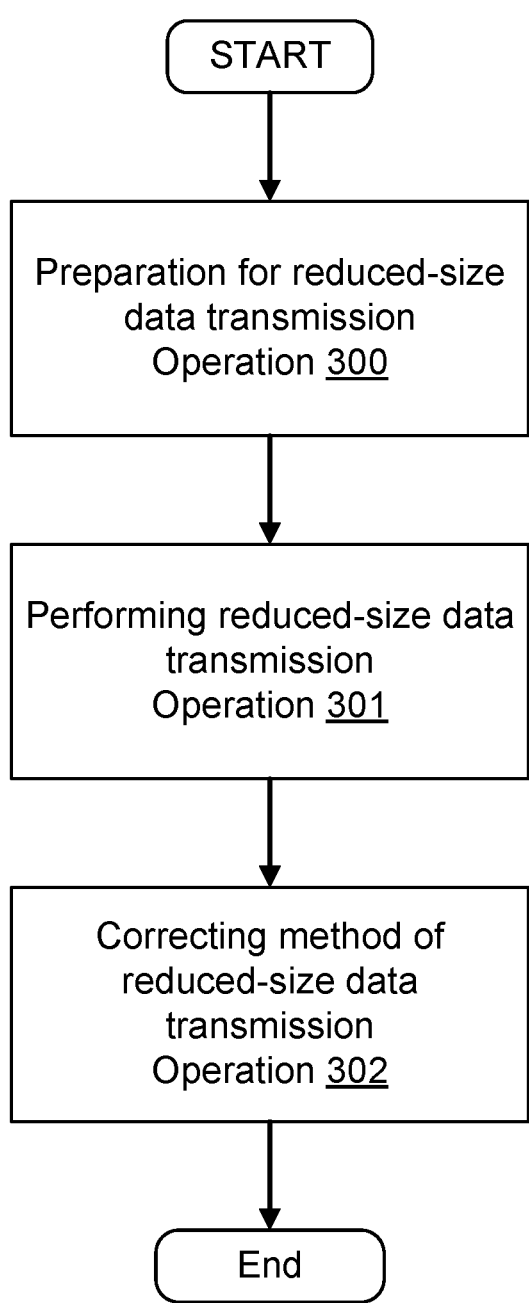
FIG. 3A shows a flow diagram illustrating a method of aggregating data in a distributed system in accordance with an embodiment.
Figure 3B:
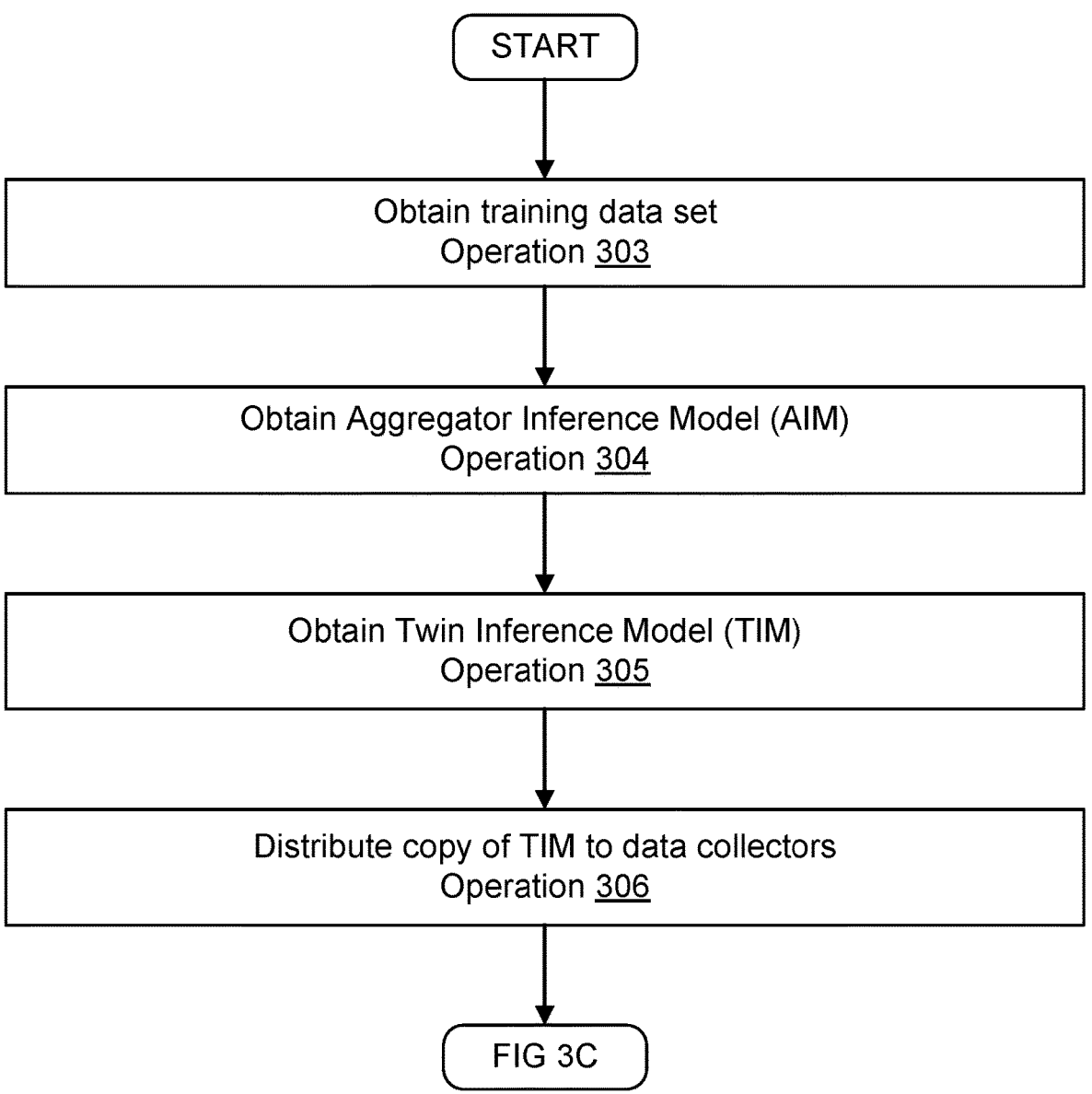
FIG. 3B shows a flow diagram illustrating a method of preparing for reduced-size data transmission in accordance with an embodiment.
Figure 3C:
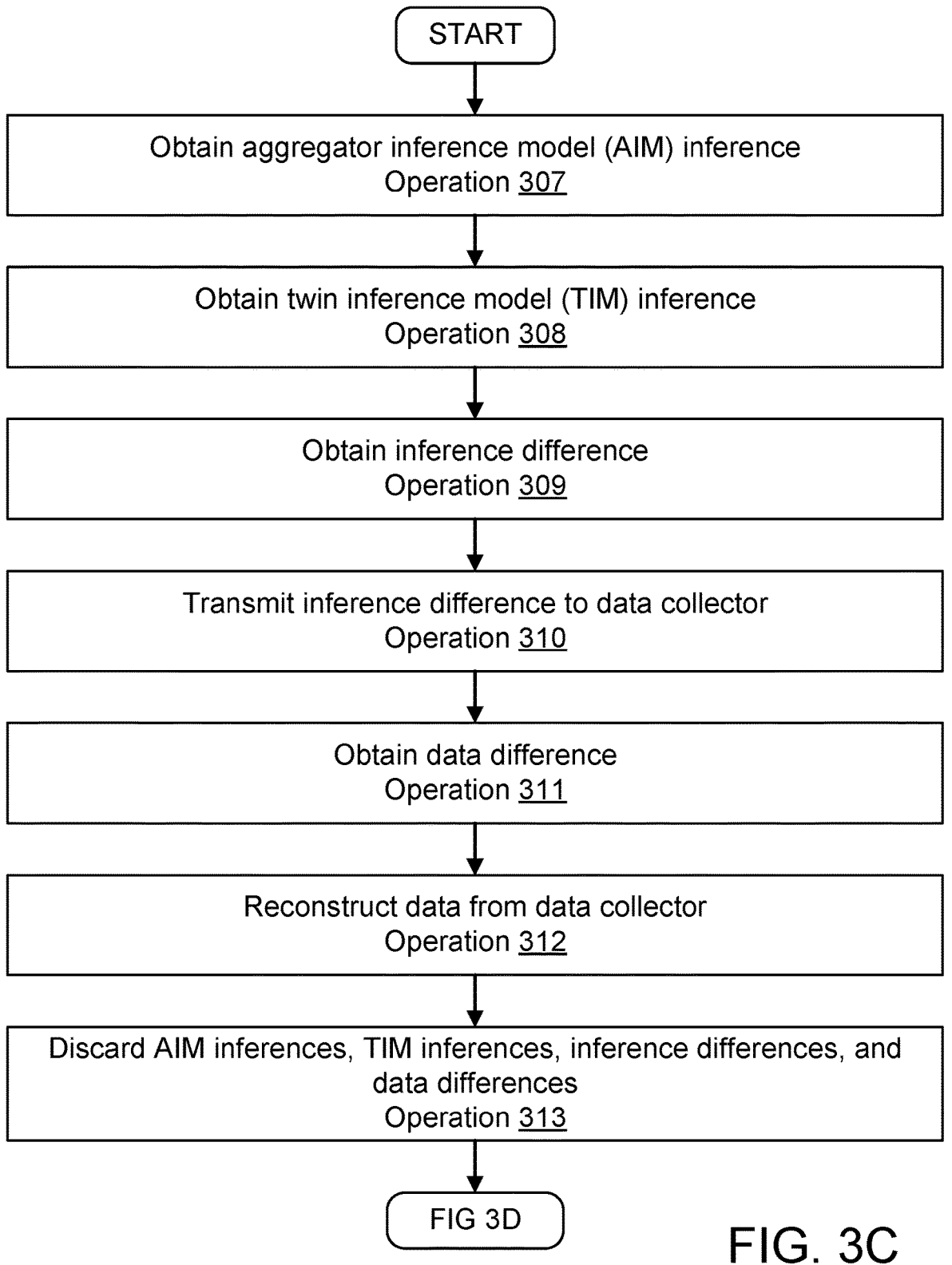
FIG. 3C shows a flow diagram illustrating a method of performing reduced-size data transmission in accordance with an embodiment.
Figure 3D:
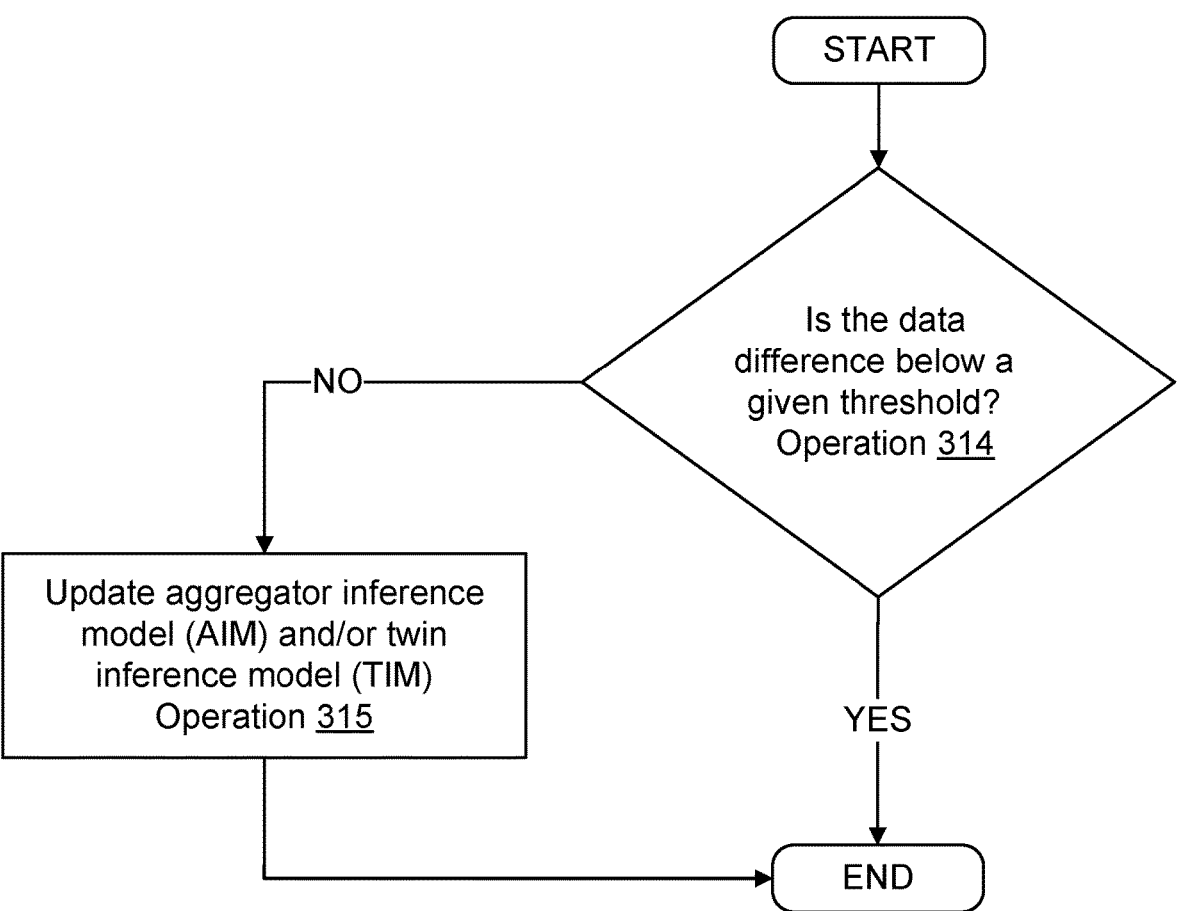
FIG. 3D shows a flow diagram illustrating a method of correcting a method of reduced-size data transmission in accordance with an embodiment.
Figure 3E:
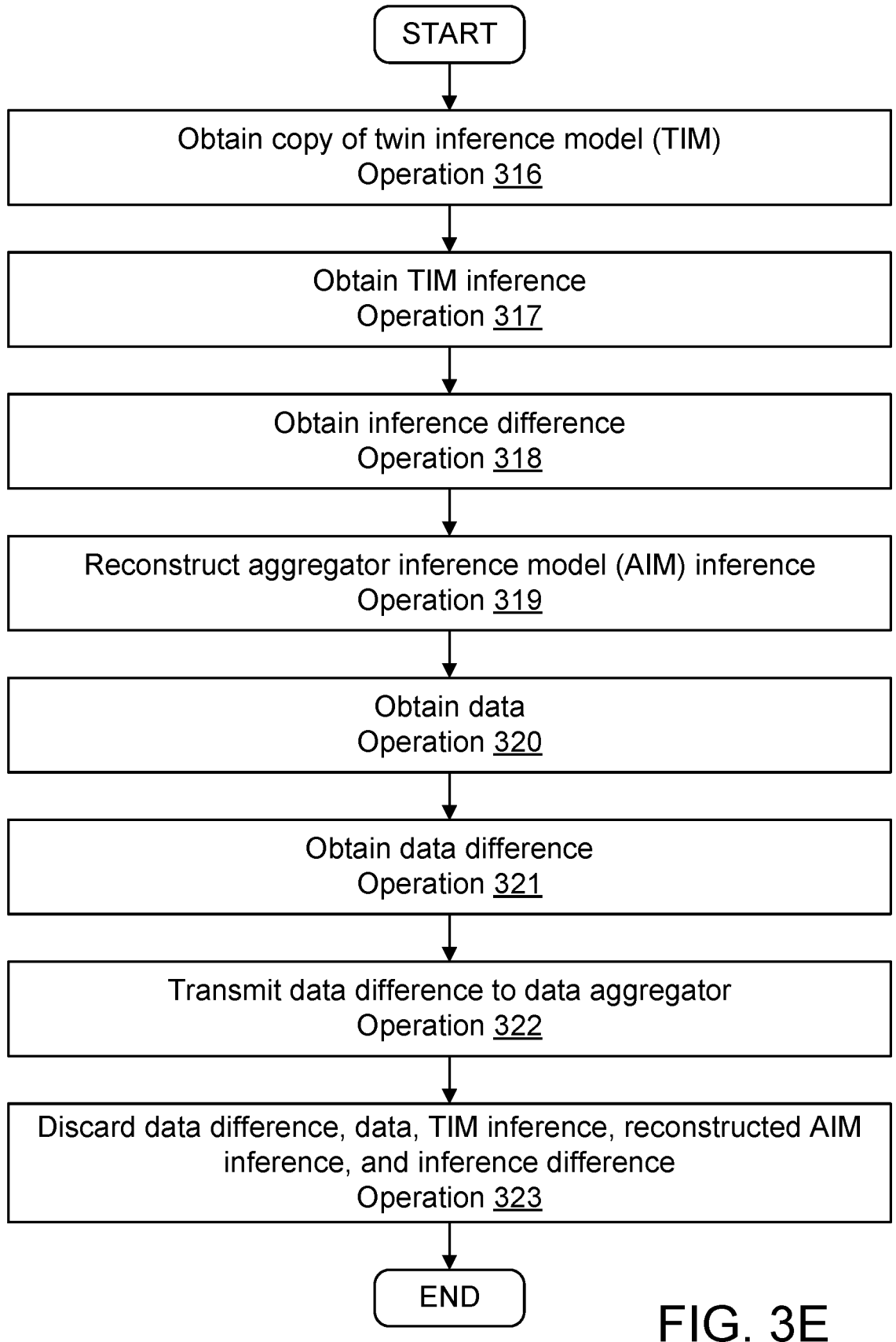
FIG. 3E shows a flow diagram illustrating a method of data collection in accordance with an embodiment.

When performing its functionality, data collectors 100 may perform all, or a portion, of the methods and/or actions shown in FIG. 3E.

Data collectors 100 and/or data aggregator 102 may be implemented using a computing device such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 5.

In an embodiment, one or more of data collectors 100 are implemented using an internet of things (IoT) device, which may include a computing device. The IoT device may operate in accordance with a communication model and/or management model known to the data aggregator 102, other data collectors, and/or other devices.

Any of the components illustrated in FIG. 1 may be operably connected to each other (and/or components not illustrated) with a communication system 101. In an embodiment, communication system 101 includes one or more networks that facilitate communication between any number of components. The networks may include wired networks and/or wireless networks (e.g., and/or the Internet). The networks may operate in accordance with any number and types of communication protocols (e.g., such as the internet protocol).

In an embodiment, the system of FIG. 1 may utilize both uplink (e.g., data aggregator to data collector) and downlink (e.g., data collector to data aggregator) pathways to transmit information throughout the distributed environment. Downlink pathways may be more commonly utilized for data collection purposes and, therefore, the uplink pathways may provide an available, under-utilized resource for the system of FIG. 1. In order to limit data transmission, reduced-size representations of data (e.g., inference differences and/or data differences) may be transmitted rather than the data itself via these pathways. Further, to balance or improve the use of under-utilized pathways, inference differences may be provided to the data collectors via the uplink pathways. By doing so, the quantity of data transmitted over communication system 101 may be reduced overall and distributed across uplink and downlink pathways to avoid excessive consumption of network bandwidth over the downlink pathways.

While illustrated in FIG. 1 as included a limited number of specific components, a system in accordance with an embodiment may include fewer, additional, and/or different components than those illustrated therein.

Figure 2A:
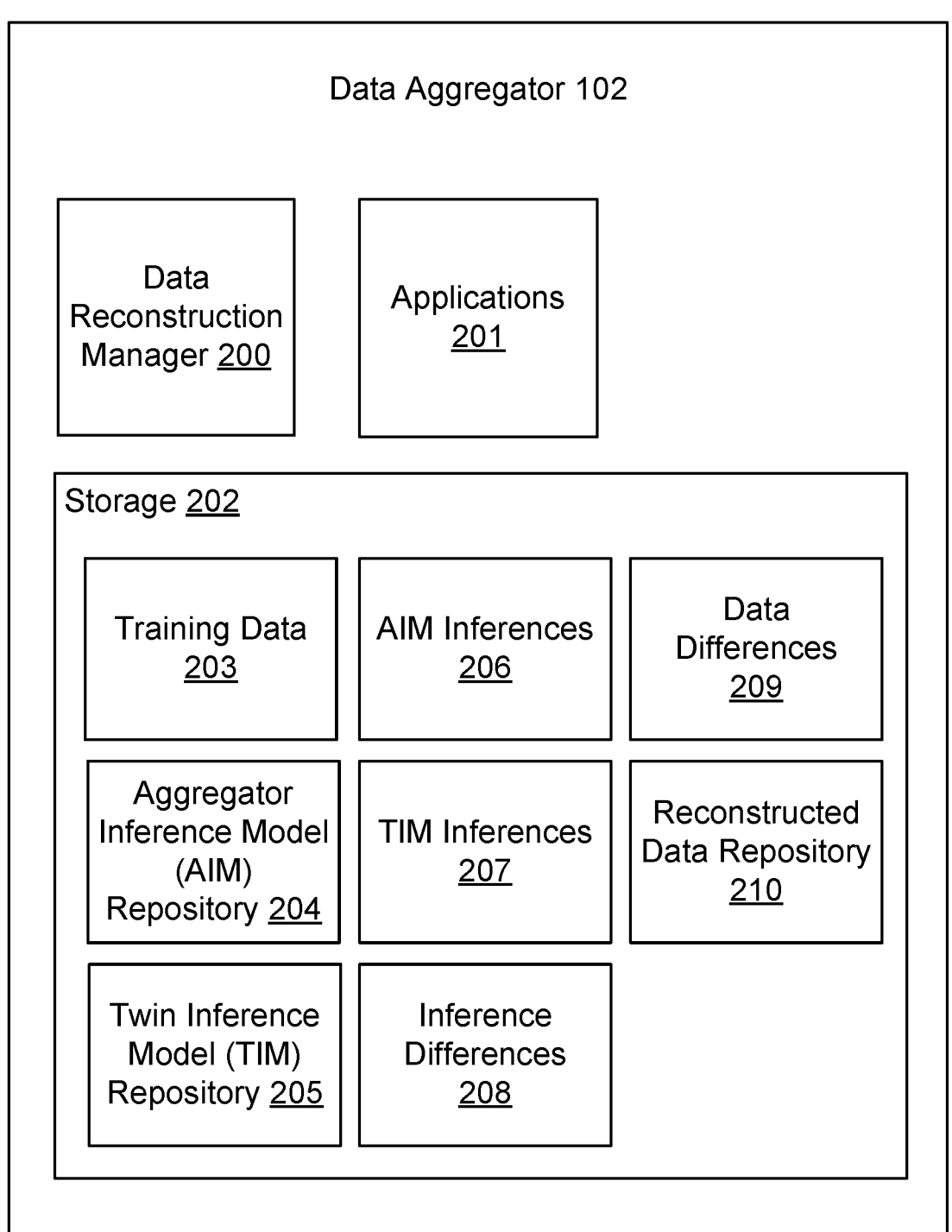
FIG. 2A shows a block diagram illustrating a data aggregator in accordance with an embodiment.

As discussed above, the system of FIG. 1 may include one or more data aggregators. Turning to FIG. 2A, a diagram of data aggregator 102 in accordance with an embodiment is shown. Data aggregator 102 may provide computer-implemented services that utilize data aggregated from various sources within a distributed environment. In order to do so, data aggregator 102 may utilize aggregated data without accessing (all of, or a portion thereof) data based on a series of measurements obtained by the sources (e.g., such as data collected by data collectors 100). By doing so, data transmission may be reduced and, therefore, communication bandwidth may be conserved. To provide its functionality, data aggregator 102 may include data reconstruction manager 200, applications 201, and/or storage 202. Each of these components is discussed below.

Data reconstruction manager 200 may (e.g., to provide all, or a portion, of the computer-implemented services) (i) obtain one or more aggregator inference models (AIMs), (ii) obtain one or more twin inference models (TIMs), (iii) distribute a copy of one or more TIMs to sources throughout a distributed environment (e.g., data collectors 100), (iv) obtain one or more AIM inferences, (v) obtain one or more TIM inferences, (vi) obtain one or more inference differences based on the AIM inferences and/or TIM inferences, (vii) transmit one or more inference differences to sources (which may also host a TIM model thereby allowing the sources to have access to similar TIM inferences without needing to transmit the TIM inferences between the components) throughout a distributed environment (e.g., data collectors 100), (viii) obtain one or more data differences from sources throughout a distributed environment (e.g., data collectors 100), (ix) reconstruct data based on measurements performed by data collectors 100 using data differences obtained from the data collectors and AIM inferences, (x) delete AIM inferences, TIM inferences, inference differences, and/or data differences from storage 202, (xi) determine whether the data difference falls below a threshold, (xii) when the data difference falls below a threshold, treat the AIM as accurate and store reconstructed data in reconstructed data repository 210, and/or (xiii) when the data difference falls outside a threshold, treat the AIM as inaccurate and perform corrective action to improve the accuracy of future inferences obtained by the AIM using training data 203 (and/or other data).

In an embodiment, data reconstruction manager 200 may obtain one or more AIMs. In one scenario, data reconstruction manager 200 may obtain one or more AIMs from some entity through a communication system (e.g., communication system 101). In another scenario, one or more AIMS may be generated by data reconstruction manager 200 using training data. In the second scenario, training data may be fed into one or more predictive algorithms including, but not limited to, artificial neural networks, decision trees, support-vector machines, regression analysis, Bayesian networks, and/or genetic algorithms to generate one or more AIMs. The AIMs may be generated via other methods without departing from embodiments disclosed herein.

To generate an AIM, for example, a training data set may include a set of temperature measurements taken at various times in an industrial environment by one or more temperature sensors. Any of the above mentioned inference models (or other predictive algorithms) may be trained using this data set to predict future temperature measurements in the same environment. Data reconstruction manager 200 may use these AIMs to obtain inferences intended to predict data based on measurements performed by data collectors (e.g., data collectors 100).

In an embodiment, data reconstruction manager 200 may obtain one or more TIMs. In one scenario, data reconstruction manager 200 may obtain one or more TIMs from some entity through a communication system (e.g., communication system 101). In another scenario, one or more TIMs may be generated by data reconstruction manager 200 using training data. In the second scenario, training data may be fed into one or more predictive algorithms including, but not limited to, artificial neural networks, decision trees, support-vector machines, regression analysis, Bayesian networks, and/or genetic algorithms to generate one or more TIMs. The TIMs may be generated via other methods without departing from embodiments disclosed herein.

To generate a TIM, for example, a training data set may include a set of temperature measurements taken at various times in an industrial environment by one or more temperature sensors. Any of the above mentioned inference models (or other predictive algorithms) may be trained using this data set to predict future temperature measurements in the same environment. Data reconstruction manager 200 may use one copy of these trained TIMs to obtain inferences intended to predict data based on measurements performed by data collectors (e.g., data collectors 100).

In an embodiment, data reconstruction manager 200 may distribute copies of any number of TIMs to sources (e.g., data collectors 100) throughout the distributed environment. By doing so, both data collectors 100 and data aggregator 102 may have access to identical TIM inferences without needing to distribute TIM inferences via communication system 101. The presence of the TIM inferences at the sources may allow the sources to reconstruct the AIM inferences using the inference differences, thereby providing the sources with inferences that are more likely to be accurate without incurring the computational overhead of operating an AIM. Consequently, a reduced quantity of data (e.g., in the form of inference differences and data differences) may be transmitted via communication system 101 and used to reconstruct data obtained via measurements performed by data collectors (e.g., data collectors 100) by virtue of having access to AIM inferences, as described below.

In an embodiment, data reconstruction manager 200 may obtain one or more AIM inferences using the AIM described above. An AIM inference may be a prediction of data obtained via measurements performed by a data collector (e.g., data collector 100A). For example, an AIM hosted by the data aggregator may generate an AIM inference for a given time $(t_1)$ of 36° C. to predict data obtained via a temperature sensor in an industrial environment.

In an embodiment, data reconstruction manager 200 may obtain one or more TIM inferences using the TIM described above. The TIM may be used to predict data obtained via measurements performed by a data collector (e.g., data collector 100A). The data aggregator and the data collector may each host an identical copy of the TIM and, therefore, may generate identical TIM inferences.

Continuing with the above example, the copy of the TIM hosted by the data aggregator may generate the following temperature inference for a given time $(t_1)$: 32° C. (identical to the temperature inference generated by the temperature sensor). The data aggregator may determine the difference between the TIM inference and the AIM difference as described below.

In an embodiment, the TIM may consume fewer computing resources than the AIM during operation. Therefore, the data collector may consume fewer computing resources by hosing a copy of the TIM rather than a copy of the AIM. The AIM and the TIM may not generate identical inferences even if they are trained with an identical set of training data due to the discrepancy in consumption of computing resources. Therefore, in order to allow the data collector to access AIM inferences without hosting a copy of the AIM, the data aggregator may transmit an inference difference to the data collector as described below.

In an embodiment, data reconstruction manager 200 may obtain one or more inference differences. An inference difference may be any reduced-size representation of inferences based on: (i) an AIM inference obtained by the data aggregator and (ii) a TIM inference obtained by the data aggregator. The AIM inference used to obtain the inference difference may be generated by the AIM as described above. The TIM inference used to obtain the inference difference may be generated by the copy of the TIM hosted by the data aggregator as described above. Both the AIM inference and the TIM inference may be intended to match data obtained via a measurement performed by a data collector (e.g., data collector 100A).

For example, the AIM and the TIM may both be trained to predict temperature measurements performed by a temperature sensor in an industrial environment. At a given time ($t_1$), the AIM may obtain an AIM inference of 36.0° C. with a binary sequence of 11001010 and the TIM may obtain a TIM inference of 32.0° C. with a binary sequence of 10011010. In order to determine the inference difference between the AIM inference and the TIM inference, the data aggregator may utilize the following formula to generate an inference difference binary sequence: Inference difference binary sequence=AIM inference binary sequence–TIM inference binary sequence (e.g., bit-wise difference operation). Therefore, the temperature sensor may calculate the temperature difference binary sequence as 01010000. Compressing the temperature difference binary sequence may result in 3 bits of information transmitted over communication system 101.

In an embodiment, data reconstruction manager 200 may treat the difference as a value difference, in which the numerical value of the AIM inference and the TIM inference may be subtracted rather than the bit sequences. Using the example values given above, the AIM inference may be 36.0° C. and the TIM inference may be 32.0° C. In order to calculate the inference difference, the data aggregator may utilize the following formula to generate an inference difference: inference difference=AIM inference–TIM inference. Therefore, the temperature sensor may calculate the inference difference as 4.0° C. by subtracting 32.0° C. from 36.0° C. The temperature difference may have the following binary sequence: 00100001. Compressing the temperature difference binary sequence may result in 3 bits of information transmitted over communication system 101. Differences may be obtained via other methods without departing from embodiments disclosed herein.

In an embodiment, data reconstruction manager 200 may transmit one or more inference differences to sources throughout a distributed environment (e.g., data collectors 100). The inference differences may be transmitted to the data collectors in order to allow the data collectors to reconstruct AIM inferences to predict data based on measurements performed by the data collectors. The data collector may reconstruct the AIM inference in order to obtain a data difference. Refer to operations 318-321 in FIG. 3E for additional details regarding the use of inference differences by the data collector to obtain data differences.

In an embodiment, data reconstruction manager 200 may obtain one or more data differences from sources throughout a distributed environment (e.g., data collectors 100). A data difference may be any reduced-size representation of data based on: (i) a measurement performed by a data collector (e.g., data collector 100A) and (ii) an inference obtained by the data collector (e.g., data collector 100A). The inference used to obtain the difference may be a reconstructed AIM inference based on: (i) the inference difference from the data aggregator and (ii) a TIM inference obtained from the copy of the TIM hosted by the data collector. Refer to operations 319-321 in FIG. 3E for additional details regarding the reconstruction of AIM inferences and generation of data differences by the data collector. The reconstructed AIM inference used to obtain the data difference may be intended to match the data obtained via a measurement performed by a data collector (e.g., data collector 100A).

In an embodiment, data reconstruction manager 200 may reconstruct data from data collectors 100 using: (i) data differences obtained from the data collector and (ii) AIM inferences generated by the AIM hosted by the data aggregator. Refer to operation 312 in FIG. 3C for additional details regarding reconstruction of data. By reconstructing data from the data collectors, the data aggregator may be able to obtain an exact measurement from the data collectors without exchanging any data over communication system 101. By doing so, the communication network bandwidth may be conserved and power consumption due to data transmission may be reduced throughout the distributed environment.

In an embodiment, data reconstruction manager 200 may determine whether the data difference falls below a threshold. The threshold may be any static or dynamic threshold, may be set by a user, and/or may be obtained from another entity through a communication system (e.g., communication system 101). For example, the threshold may be 5 bits. Therefore, any difference transmitted to data aggregator 102 containing 5 bits or less (e.g., the data minimized version of the data difference that may be transmitted) may fall below the threshold. In contrast, any data difference transmitted to data aggregator 102 containing more than 5 bits may fall outside the threshold. The threshold may be intended to limit the amount of data transmitted over communication system 101 during data collection.

For example, the data difference obtained by the data aggregator may include 2 bits of information. The threshold for data differences in this scenario may be 5 bits. Therefore, the data difference falls below the threshold, the AIM (and/or the TIM) may be determined accurate, and the temperature reading reconstructed from the temperature sensor may be stored in reconstructed data repository 210.

In a second scenario, the data difference obtained by data reconstruction manager 200 may include 8 bits of information. Therefore, the difference may fall outside the threshold of 5 bits of information and the AIM (and/or the TIM) may be determined inaccurate. Inaccurate AIMs (and/or TIMs) may indicate that the AIMs (and/or TIMs) require re-training in order to increase accuracy of future inferences. Data reconstruction manager 200 may obtain at least a portion of a series of measurements from the temperature sensor and/or data from reconstructed data repository 210 in order to re-train the AIMS (and/or the TIMs).

In an embodiment, data collectors 100 may determine whether the data difference falls below the threshold prior to transmitting the data difference to data aggregator 102. In this scenario, data collectors 100 may not transmit the data difference to data aggregator 102. Instead, data collectors 100 may transmit an acknowledgment to data aggregator 102 indicating that the data difference falls below the threshold. Consequently, data aggregator 102 may treat the AIM inferences as data based on measurements performed by data collectors 100 and store the AIM inferences in storage 202 without accessing any measurements from data collectors 100. Data reconstruction may be performed via other methods without departing from embodiments disclosed herein.

Applications 201 may consume data from reconstructed data repository 210 to provide computer-implemented services to users of data aggregator 102 and/or other computing devices operably connected to data aggregator 102. The computer-implemented services may include any type and quantity of services which may utilize, at least in part, data aggregated from a variety of sources (e.g., data collectors 100) within a distributed environment.

For example, applications 201 may use the aggregated data to modify industrial manufacturing processes; to sound alerts for undesired operation of systems, locations of persons in an environment; and/or for any other type of purpose. Consequently, applications 201 may perform various actions (e.g., action sets) based on the data in reconstructed data repository 210.

In an embodiment, one or more of data reconstruction manager 200 and applications 201 is implemented using a hardware device including circuitry. The hardware device may be, for example, a digital signal processor, a field programmable gate array, or an application specific integrated circuit. The circuitry may be adapted to cause the hardware device to perform the functionality of data reconstruction manager 200 and/or applications 201. One or more of data reconstruction manager 200 and applications 201 may be implemented using other types of hardware devices without departing from embodiments disclosed herein.

In an embodiment, one or more of data reconstruction manager 200 and applications 201 is implemented using a processor adapted to execute computing code stored on a persistent storage that when executed by the processor performs the functionality of data reconstruction manager 200 and/or applications 201 discussed throughout this application. The processor may be a hardware processor including circuitry such as, for example, a central processing unit or a microcontroller. The processor may be other types of hardware devices for processing digital information without departing from embodiments disclosed herein.

When providing its functionality, data reconstruction manager 200 and/or applications 201 may perform all, or a portion, of the operations and/or actions discussed with respect to FIGS. 3A-3D.

When providing its functionality, data reconstruction manager 200 and/or applications 201 may store data and use data stored in storage 202

In an embodiment, storage 202 is implemented using physical devices that provide data storage services (e.g., storing data and providing copies of previously stored data). The devices that provide data storage services may include hardware devices and/or logical devices. For example, storage 202 may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage 202 may include a memory device (e.g., a dual in line memory device) in which data is stored and from which copies of previously stored data are provided. In another example, storage 202 may include a persistent storage device (e.g., a solid-state disk drive) in which data is stored and from which copies of previously stored data is provided. In a still further example, storage 202 may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Storage 202 may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

Storage 202 may store data structures including, for example, training data 203, AIM repository 204, TIM repository 205, AIM inferences 206, TIM inferences 207, inference differences 208, data differences 209, and reconstructed data repository 210. Any of these data structures may be usable by components of the system in FIG. 1. Any of these data structures may be implemented using, for example, lists, tables, databases, linked lists, and/or other type of data structures. Any of the data structures may be shared, spanned across multiple devices, and may be maintained and used by any number of entities. Additionally, while illustrated as including a limited amount of specific data, any of these data structures may include additional, less, and/or different data without departing from embodiments disclosed herein. Each of these data structures is discussed below.

In an embodiment, training data 203 may include training data usable to train a machine learning model (and/or other types of inference-generation models). Training data 203 may be obtained from various sources throughout a distributed environment (e.g., from data collectors 100) and may include (all of, or a portion thereof) a series of measurements representing an ambient environment (e.g., a characteristic thereof) and/or other types of measurements.

For example, training data 203 may include a set of temperature measurements taken at different times in an industrial environment by one or more temperature sensors. Temperature sensors may collect a set of temperature measurements at different times over any period of time. For example, one temperature sensor may record the following data over the course of one hour: $T_1=36.5°$ C., $T_2=35.0°$ C., $T_3=35.5°$ C., $T_4=35.0°$ C., $T_5=36.0°$ C. These temperature measurements may be temporarily or permanently stored by the temperature sensor and transmitted to a central temperature control system when requested for purposes of training a machine-learning model to predict future temperature measurements in the same environment (and/or other purposes).

In an embodiment, AIM repository 204 may include copies of one or more AIMs. The inference models may be obtained by feeding training data 203 into a machine learning (e.g., a deep learning) model to predict data based on measurements performed by data collectors 100 (and/or other sources) without having access to the measurements.

For example, any number of temperature sensors throughout a distributed environment may record temperature measurements at various time intervals. Over any period of time, these temperature measurements may be collected and transmitted to a central temperature control system. The central temperature control system may utilize the set of temperature measurements for the purpose of training a machine-learning model to predict future temperature measurements in the same environment (and/or for other purposes) thereby obtaining a trained machine-learning model.

The central temperature control system may train the machine-learning model to predict a temperature value at a specific time. For example, the inference model hosted by the data aggregator may predict a value of 35.5° C. at $t_{12}$ without obtaining any temperature measurements from the temperature sensor.

In an embodiment, TIM repository 205 may include copies of one or more TIMs. One copy of each TIM may be hosted by data aggregator 102, while another identical copy of each TIM may be hosted by one or more sources (e.g., data collectors 100) throughout a distributed environment. The TIMs may be obtained by feeding training data 203 into a machine learning e.g., a deep learning) model to predict data based on measurements performed by data collectors 100 (and/or other sources) without having access to the measurements. Consequently, data aggregator 102 and each source (e.g., data collector) throughout a distributed environment may have access to identical inferences generated by copies of the TIMs.

For example, any number of temperature sensors throughout a distributed environment may record temperature measurements at various time intervals. Over any period of time, these temperature measurements may be collected and transmitted to a central temperature control system. The central temperature control system may utilize the set of temperature measurements for the purpose of training a machine-learning model to predict future temperature measurements in the same environment (and/or for other purposes) thereby obtaining a TIM (which may be distributed to one or more of the temperature sensors).

The central temperature control system may train the twin machine-learning model to predict a temperature value at a specific time. For example, the copy of the TIM hosted by the data aggregator may predict a value of 34.5° C. at $t_{12}$ without obtaining any temperature measurements from the temperature sensor. Consequently, the copy of the TIM hosted by the temperature sensor may have access to an identical inference of 34.5° C. at $t_{12}$.

As noted above, the TIMs of TIM repository 205 may be of lower accuracy than those AIMs of AIM repository 204 (e.g., even though both may be configured to attempt to predict the same quantity). However, the computational cost for operating the TIMs may be lower than that for operating the AIMs. By appropriately distributing the TIM models, the computational load may be distributed in a manner that tends to reduce the likelihood of overloading the components within the distributed system.

AIM inferences 206 may include any number of AIM inferences obtained by data reconstruction manager 200. The AIM inferences may be generated by the AIM from AIM repository 204. The AIMS may be obtained by feeding training data 203 into a machine learning (e.g., a deep learning) model. In an embodiment, a deep learning-based model is used to predict future measurements collected by data collectors 100 without having access to the series of measurements. The inferences may be, for example, predictions of temperature readings collected by a temperature sensor at various times. The inferences may be other types of predictions without departing from embodiments disclosed herein.

TIM inferences 207 may include any number of inferences obtained by data reconstruction manager 200. The inferences may be generated by a copy of a TIM from TIM repository 205. The TIMs may be obtained by feeding training data 203 into a machine learning (e.g., a deep learning) model. In an embodiment, a deep learning-based model is used to predict future measurements collected by data collectors 100 without having access to the series of measurements. Data aggregator 102 and data collectors 100 may host identical copies of a TIM and, therefore, may have access to identical inferences. The inferences may be, for example, predictions of temperature readings collected by a temperature sensor at various times. The inferences may be other types of predictions without departing from embodiments disclosed herein. The TIMs may consume fewer computing resources than the AIMs during operation and, therefore, the TIM inferences may not be identical to the AIM inferences. In this scenario, data reconstruction manager may obtain an inference difference as described below.

Inference differences 208 may include any number of inference differences obtained by the data aggregator 102. An inference difference may be any reduced-size representation of inferences based on: (i) an AIM inference obtained by the data aggregator and (ii) a TIM inference obtained by the data aggregator. The AIM inference used to obtain the inference difference may be generated by the AIM as described above. The TIM inference used to obtain the inference difference may be generated by the copy of the TIM hosted by the data aggregator as described above. Both the AIM inference and the TIM inference may be intended to match data obtained via a measurement performed by a data collector (e.g., data collector 100A).

For example, the AIM and the TIM may both be trained to predict temperature measurements performed by a temperature sensor in an industrial environment. At a given time ($t_1$), the AIM may obtain an AIM inference of 36.0° C. with a binary sequence of 11001010 and the TIM may obtain a TIM inference of 32.0° C. with a binary sequence of 10011010. In order to determine the inference difference between the AIM inference and the TIM inference, the data aggregator may utilize the following formula to generate an inference difference binary sequence: Inference difference binary sequence=AIM inference binary sequence−TIM inference binary sequence (e.g., bit-wise difference operation). Therefore, the temperature sensor may calculate the inference difference binary sequence as 01010000. Compressing the inference difference binary sequence may result in 3 bits of information transmitted over communication system 101.

In an embodiment, data reconstruction manager 200 may treat the inference difference as a value difference, in which the numerical value of the AIM inference and the TIM inference may be subtracted rather than the bit sequences. Using the example values given above, the AIM inference may be 36.0° C. and the TIM inference may be 32.0° C. In order to calculate the inference difference, the data aggregator may utilize the following formula to generate an inference difference: inference difference=AIM inference−TIM inference. Therefore, the temperature sensor may calculate the inference difference as 4.0° C. by subtracting 32.0° C. from 36.0° C. The inference difference may have the following binary sequence: 00100001. Compressing the inference difference binary sequence may result in 3 bits of information transmitted over communication system 101. Inference differences may be obtained via other methods without departing from embodiments disclosed herein.

In an embodiment, data differences 209 may include any number of data differences obtained from various sources within a distributed environment (e.g., data collectors 100). A data difference may be any reduced-size representation of data based on: (i) a measurement performed by a data collector (e.g., data collector 100A) and (ii) an inference obtained by the data collector (e.g., data collector 100A). The inference used to obtain the data difference may be a reconstructed AIM inference based on: (i) the inference difference from the data aggregator and (ii) a TIM inference obtained from the copy of the TIM hosted by the data collector. Refer to operations 319-321 in FIG. 3E for additional details regarding the reconstruction of AIM inferences and generation of data differences by the data collector. The reconstructed AIM inference used to obtain the data difference may be intended to match the data obtained via a measurement performed by a data collector (e.g., data collector 100A).

In an embodiment, reconstructed data repository 210 may include any amount of reconstructed data obtained by data reconstruction manager 200. Data based on measurements performed by data collectors (e.g., data collectors 100) may be reconstructed by data reconstruction manager 200 without data reconstruction manager 200 having access to the measurements performed by the data collectors. Data reconstruction may be performed using (i) a data difference obtained by data aggregator 102 and (ii) an AIM inference obtained by data aggregator 102 using the AIM. By transmitting the data difference, a reduced amount of data may be transmitted across communication system 101 and, therefore, network bandwidth and power consumption may be minimized throughout the distributed environment during data collection. Refer to operation 312 in FIG. 3C for additional details regarding data reconstruction by the data aggregator.

While illustrated in FIG. 2A as including a limited number of specific components, a data aggregator in accordance with an embodiment may include fewer, additional, and/or different components than shown in FIG. 2A.

Figure 2B:
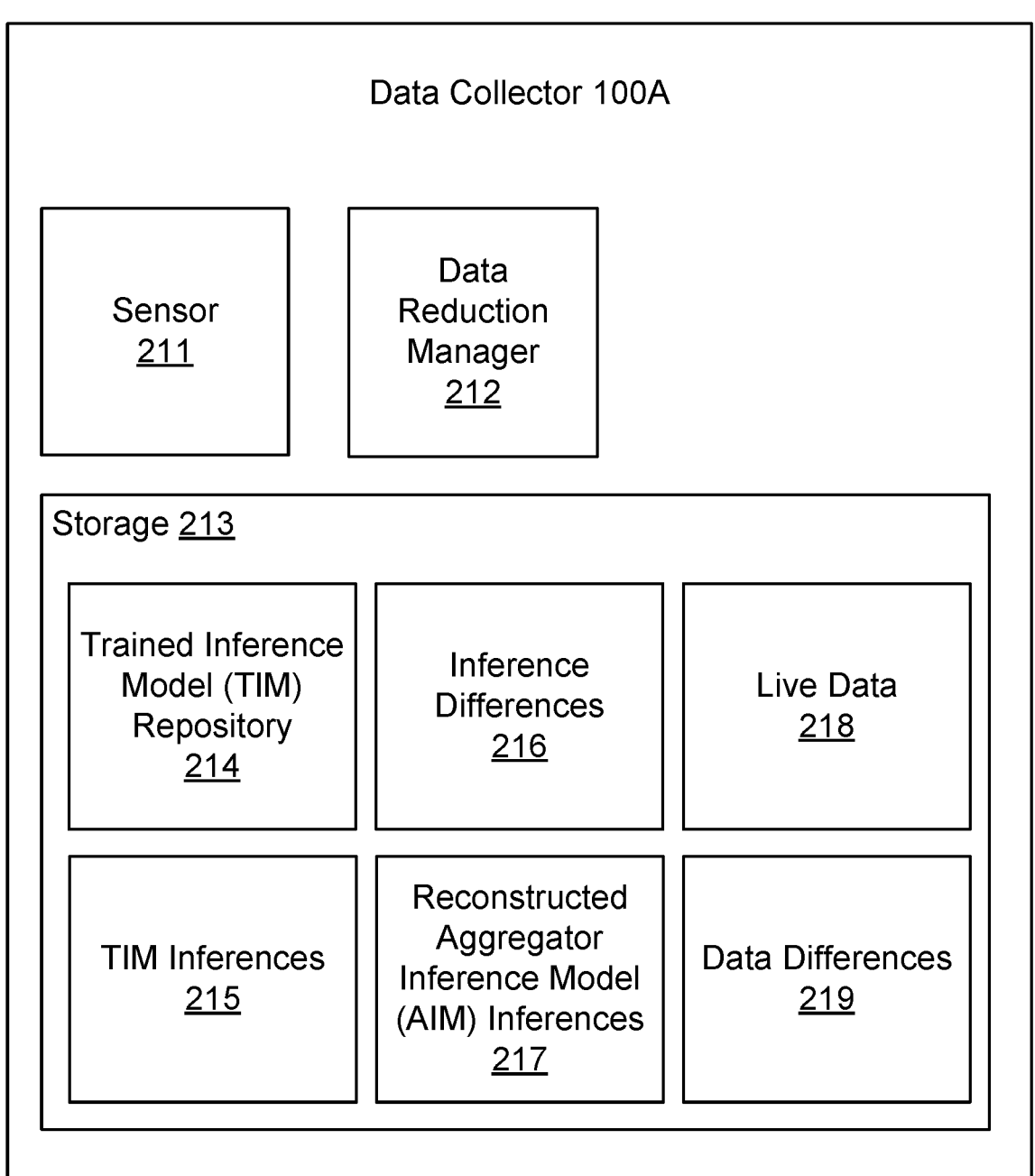
FIG. 2B shows a block diagram illustrating a data collector in accordance with an embodiment.

As discussed above, the system of FIG. 1 may include one or more data collectors (e.g., data collectors 100A-100N). Turning to FIG. 2B, a diagram of data collector 100A in accordance with an embodiment is shown. Any of data collectors 100 may be similar to data collector 100A. Data collector 100A may provide data collection services to users and/or other computing devices operably connected to data collector 100A. The data collection services may include any type and quantity of services including, for example, temperature data collection, pH data collection, humidity data collection, etc.

Following data collection, data collector 100A may generate a data difference (a reduced-size representation) of a measurement using: (i) data obtained via a measurement performed by data collector 100A and (ii) an inference obtained by data collector 100A. The inference used to obtain the data difference may be a reconstructed AIM inference based on: (i) the inference difference from the data aggregator and (ii) a TIM inference obtained from the copy of the TIM hosted by the data collector. The reconstructed AIM inference used to obtain the data difference may be intended to match the data obtained via a measurement performed by a data collector (e.g., data collector 100A). Data collector 100A may transmit this reduced-size data difference to data aggregator 102 instead of the data obtained via a measurement performed by data collector 100A. By doing so, the amount of data transmitted throughout a distributed environment may be reduced, which may lead to a reduction in communication bandwidth consumption and energy consumption throughout the environment. To provide its functionality, data collector 100A may include sensor 211, data reduction manager 212, and storage 213. Each of these components is described below.

Sensor 211 may obtain a series of measurements representing a characteristic of an ambient environment. For example, sensor 211 may be a temperature sensor positioned in an industrial environment to obtain temperature measurements at various time intervals over the course of each hour. For example, sensor 211 may obtain the following series of measurements over the course of the first hour of data collection: $T_1=35.5°$ C., $T_2=35.0°$ C., $T_3=36.0°$ C., $T_4=36.0°$ C., $T_5=35.5°$ C. Sensor 211 may store at least a portion of these measurements in storage 213 (and/or other locations) as, for example, live data 218.

Data reduction manager 212 may (e.g., to provide all, or a portion, of the data collection services): (i) obtain a copy of one or more TIMs, (ii) obtain one or more TIM inferences using the TIMs, (iii) obtain one or more inference differences from the data aggregator (and/or other sources), (iv) reconstruct one or more AIM inferences (identical to AIM inferences obtained by data aggregator) using the inference differences and the TIM inferences, (v) obtain live data from storage 213 (and/or other locations), (vi) obtain one or more data differences using live data from storage 213 and the reconstructed AIM inferences, (vii) transmit one or more data differences to data aggregator 102, (viii) discard data differences, live data, TIM inferences, reconstructed AIM inferences, and inference differences when no longer needed, and/or (ix) respond to commands received from data aggregator 102 such as replacement of one or more TIMs with other TIMs (e.g., which may be updated).

In an embodiment, data reduction manager 212 may obtain a copy of one or more trained TIMs from data aggregator 102 (and/or from other sources). One copy of each TIM may be hosted by data aggregator 102, while another identical copy of each TIM may be hosted by data collector 100A. Therefore, the data aggregator and data collector may have access to identical inferences generated by the copies of the trained TIMs. Refer to the description of FIG. 2A for additional details regarding the training of twin inference models.

In an embodiment, data reduction manager 212 may obtain one or more TIM inferences using the copy of the TIM described above. The TIM may be used to predict data obtained via measurements performed by a data collector (e.g., data collector 100A). The data aggregator and the data collector may each host an identical copy of the TIM and, therefore, may generate identical inferences.

For example, data collector 100A may be a temperature sensor positioned in an industrial environment to monitor the temperature of that environment. The copy of the TIM hosted by the temperature sensor may generate the following TIM inference for a given time: 35.5° C. (identical to the TIM inference generated by data aggregator 102). The temperature sensor may use this TIM inference to reconstruct an AIM inference as described below.

In an embodiment, data collector 100A may obtain one or more inference differences from data aggregator 102. An inference difference may be any reduced-size representation of inferences based on: (i) an AIM inference obtained by the data aggregator and (ii) a TIM inference obtained by a copy of the TIM hosted by the data aggregator. Both the AIM inference and the TIM inference may be intended to match data obtained via a measurement performed by a data collector (e.g., data collector 100A). Refer to FIG. 2A for additional details regarding the calculation of inference differences by the data aggregator.

In an embodiment, data reconstruction manager 200 may reconstruct AIM inferences using: (i) inference differences obtained from the data aggregator and (ii) TIM inferences generated by the copy of the TIM hosted by the data collector. By reconstructing AIM inferences, the data collector may be able to obtain an exact copy of the AIM inference obtained by the data aggregator without exchanging AIM inferences over communication system 101 or operating an AIM locally. In order to reduce network transmissions, data collectors may use the reconstructed AIM inferences to obtain reduced-size representations of measurements performed by the data collectors as described below. Refer to operation 319 in FIG. 3E for additional details regarding the reconstruction of AIM inferences.

In an embodiment, data reduction manager 212 may obtain one or more data differences. A data difference may be any reduced-size representation of data based on: (i) a measurement performed by a data collector (e.g., data collector 100A) and (ii) an inference obtained by the data collector (e.g., data collector 100A). The inference used to obtain the data difference may be a reconstructed AIM inference based on: (i) an inference difference from the data aggregator and (ii) a TIM inference obtained from the copy of the TIM hosted by the data collector. The reconstructed AIM inferences may be identical (or substantially similar) to the AIM inferences generated by the data aggregator without any AIM inferences being transmitted over communication system 101. Refer to operations 319-321 in FIG. 3E for additional details regarding the reconstruction of AIM inferences and generation of data differences by the data collector.

In an embodiment, data reduction manager 212 may transmit one or more data differences to data aggregator 102. Data reduction manager 212 may transmit one or more data differences at time intervals designated by a user and/or another entity through a communication system (e.g., communication system 101). For example, data reduction manager 212 may transmit a data difference to data aggregator 102 once every minute.

In an embodiment, data reduction manager 212 may respond to commands from data aggregator 102. In a first scenario, data aggregator 102 may request a data difference at specific time intervals from data reduction manager 212. In a second scenario, data aggregator 102 may also request at least a portion of a series of measurements from data collector 100A for purposes of training or re-training inference models (and/or other purposes).

In an embodiment, one or more of sensor 211 and data reduction manager 212 is implemented using a hardware device including circuitry. The hardware device may be, for example, a digital signal processor, a field programmable gate array, or an application specific integrated circuit. The circuitry may be adapted to cause the hardware device to perform the functionality of sensor 211 and/or data reduction manager 212. One or more of sensor 211 and data reduction manager 212 may be implemented using other types of hardware devices without departing from embodiments disclosed herein.

In an embodiment, one or more of sensor 211 and data reduction manager 212 is implemented using a processor adapted to execute computing code stored on a persistent storage that when executed by the processor performs the functionality of sensor 211 and/or data reduction manager 212 discussed throughout this application. The processor may be a hardware processor including circuitry such as, for example, a central processing unit or a microcontroller. The processor may be other types of hardware devices for processing digital information without departing from embodiments disclosed herein.

In an embodiment, sensor 211 and/or data reduction manager 212 may utilize a physical device (e.g., a sensor) used to measure a characteristic of an ambient environment in order to perform the functionality of sensor 211 and/or data reduction manager 212. For example, a temperature sensor may utilize one or more thermistors, thermocouples, and/or resistance temperature detectors to collect temperature data. In a second example, a pH sensor may utilize any number of electrodes to collect pH data. The sensor may include other types of hardware devices for measuring a characteristic of an ambient environment without departing from embodiments disclosed herein.

When providing their functionality, sensor 211 and data reduction manager 212 may perform all, or a portion, of the operations and/or actions discussed with respect to FIG. 3E.

When providing its functionality, data reduction manager 212 may store data and use data stored in storage 213.

In an embodiment, storage 213 is implemented using physical devices that provide data storage services (e.g., storing data and providing copies of previously stored data). The devices that provide data storage services may include hardware devices and/or logical devices. For example, storage 213 may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage 213 may include a memory device (e.g., a dual in line memory device) in which data is stored and from which copies of previously stored data are provided. In another example, storage 213 may include a persistent storage device (e.g., a solid-state disk drive) in which data is stored and from which copies of previously stored data is provided. In a still further example, storage 213 may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Storage 213 may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

Storage 213 may store data structures including, for example, TIM repository 214, TIM inferences 215, inference differences 216, reconstructed AIM inferences 217, live data 218, and data differences 219. Any of these data structures may be usable by components of the system in FIG. 1. Any of these data structures may be implemented using, for example, lists, tables, databases, linked lists, and/or other type of data structures. Any of the data structures may be shared, spanned across multiple devices, and may be maintained and used by any number of entities. Additionally, while illustrated as including a limited amount of specific data, any of these data structures may include additional, less, and/or different data without departing from embodiments disclosed herein. Each of these data structures is discussed below.

In an embodiment, TIM repository 214 includes copies of one or more TIMs. One copy of each TIM may be hosted by data collector 100A, while another identical copy of each TIM may be hosted by data aggregator 102. The TIMs may be obtained by a data aggregator, as discussed above, by feeding training data 203 into a machine learning (e.g., a deep learning) model to predict data based on measurements performed by data collectors 100 (and/or other sources) without having access to the measurements. Therefore, data aggregator 102 and each source (e.g., data collector) throughout a distributed environment may have access to identical TIM inferences generated by copies of the TIMs after the aggregator distributes the TIMs. For additional information regarding the training of TIMs, see the description of FIG. 2A.

In an embodiment, TIM inferences 215 may include any number of TIM inferences obtained by data reduction manager 212. The TIM inferences may be generated by a copy of a TIM from TIM repository 214 as described above. The TIM inferences may be, for example, predictions of temperature readings collected by a temperature sensor at various times. For example, the copy of the TIM hosted by the data collector may predict a temperature reading of 34.5° C. at a specified time. The TIM inferences may be other types of predictions without departing from embodiments disclosed herein. Any number of TIM inferences may be stored temporarily or permanently in TIM inferences 215 (and/or other locations). For example, some TIM inferences may be removed while others may be added. Consequently, the contents of TIM inferences 215 may be updated over time to reflect more recent activity of data reduction manager 212.

In an embodiment, inference differences 216 may include any number of inference differences obtained from the data aggregator 102. An inference difference may be any reduced-size representation of inferences based on: (i) an AIM inference obtained by the data aggregator and (ii) a TIM inference obtained by the copy of the TIM hosted by the data aggregator. The AIM inference used to obtain the inference difference may be generated by the AIM hosted by the data aggregator. Both the AIM inference and the TIM inference may be intended to match data obtained via a measurement performed by a data collector (e.g., data collector 100A). Refer to the description of FIG. 2A for details and examples regarding the calculation of inference differences.

In an embodiment, the storage of TIM inferences and inference differences in storage 213 may allow the data collector to reconstruct AIM inferences locally, thereby providing the data collectors with higher-accuracy inferences without consuming the computing resources necessary to host a copy of the AIM.

In an embodiment, reconstructed AIM inferences 217 may include any amount of reconstructed AIM inferences obtained by data collector 100A. Data collector 100A may reconstruct AIM inferences using: (i) inference differences obtained from the data aggregator and (ii) TIM inferences generated by the copy of the TIM hosted by the data collector. By reconstructing AIM inferences, data collector 100A is able to obtain an exact copy of the AIM inference obtained by the data aggregator without exchanging AIM inferences over communication system 101. By doing so, the communication network bandwidth may be conserved and power consumption due to data transmission may be reduced throughout the distributed environment. Refer to operation 319 in FIG. 3E for additional details regarding the reconstruction of AIM inferences.

In an embodiment, live data 218 includes live data measurements collected by sensor 211. For example, live data 218 may include temperature measurements recorded by a temperature sensor at various time intervals. A series of temperature measurements may include the following five measurements taken over the course of one hour: $T_1=34.5°$ C., $T_2=34.5°$ C., $T_3=35.5°$ C., $T_4=35.0°$ C., $T_5=35.5°$ C. Any amount of live data may be stored temporarily and/or permanently in live data 218 (and/or other locations). For example, some measurements may be removed while others may be added. Consequently, the contents of live data 218 may be updated over time to reflect more recent activity of data reduction manager 212.

In an embodiment, data differences 219 may include any number of data differences obtained from various sources within a distributed environment (e.g., data collectors 100). A data difference may be any reduced-size representation of data based on: (i) a measurement performed by a data collector (e.g., data collector 100A) and (ii) an inference obtained by the data collector (e.g., data collector 100A). The inference used to obtain the data difference may be a reconstructed AIM inference based on: (i) the inference difference from the data aggregator and (ii) a TIM inference obtained from the copy of the TIM hosted by the data collector as described above. Refer to operations 319-321 in FIG. 3E for additional details regarding the reconstruction of AIM inferences and generation of data differences by the data collector. The reconstructed AIM inference used to obtain the data difference may be intended to match the data obtained via a measurement performed by a data collector (e.g., data collector 100A).

While illustrated in FIG. 2B as including a limited number of specific components, a data collector in accordance with an embodiment may include fewer, additional, and/or different components than shown in FIG. 2B.

As discussed above, the components of FIG. 1 may perform various methods to utilize data aggregated from various sources throughout a distributed environment. FIGS. 3A-3E illustrate methods that may be performed by the components of FIG. 1. In the diagrams discussed below and shown in FIGS. 3A-3E, any of the operations may be repeated, performed in different orders, and/or performed in parallel with or in a partially overlapping in time manner with other operations.

Turning to FIG. 3A, a flow diagram illustrating a method of aggregating data in a distributed system in accordance with an embodiment is shown.

At operation 300, the data aggregator may prepare for reduced-size data transmission. This preparation step may involve obtaining trained inference models and distributing them throughout a distributed environment. Refer to FIG. 3B for additional details regarding this preparation step.

At operation 301, the data aggregator may perform reduced-size data transmission. This step may involve the comparison of inferences generated by separate inference models and the reconstruction of data based on measurements performed by the data collectors (e.g., data collectors 100). Refer to FIG. 3C for additional details regarding this reduced-data transmission step.

At operation 302, the data aggregator may correct the method of reduced-size data transmission. Correcting the method may involve re-training or replacing inference models throughout a distributed system. Refer to FIG. 3D for additional details regarding this correction step.

Turning to FIG. 3B, a flow diagram illustrating a method of preparing for reduced-size data transmission in accordance with an embodiment is shown. The operations in FIG. 3B may be an expansion of operation 300 in FIG. 3A.

At operation 303, a training data set may be obtained by the data aggregator. The training data set may include any quantity and type of data. For example, the training data set may include a series of measurements representing an ambient environment (e.g., temperature data, humidity data, pH data).

In an embodiment, the training data set may be obtained from any number of data collectors (e.g., data collectors 100) throughout a distributed environment. For example, requests for the data may be sent to the data collectors and the data collectors may provide the data to the data aggregator in response to the requests. Such messages and/or data may be passed via a communication system operably connecting the data collector and the data aggregator.

In an embodiment, the training data set may be provided by another entity through a communication system. For example, the training data may be obtained by data collectors throughout a second distributed environment with a similar environment. This training data set may be provided to any number of data aggregators in any number of distributed environments.

At operation 304, an AIM may be obtained by the data aggregator. The AIM may be implemented with, for example, a machine learning model. The AIM may generate inferences that predict future data obtained by data collectors without having access to the data obtained by the data collectors.

In an embodiment, the AIM may be obtained by the data aggregator using a training data set. The training data set may be fed into a machine learning model (and/or other type of inference generation model) to obtain the AIM to predict future measurements from data collectors.

In an embodiment, the AIM may also be obtained from another entity through a communication system. For example, an AIM may be obtained by another entity through training a machine learning model and providing the trained machine learning model to the data aggregator. In this scenario, the AIM obtained via another entity may or may not require training by the data aggregator.

At operation 305, a TIM may be obtained by the data aggregator. The TIM may be implemented with, for example, a machine learning model. The TIM may generate inferences that predict future data obtained by data collectors without having access to the data obtained by the data collectors.

In an embodiment, the TIM may be obtained by the data aggregator using a training data set. The training data set may be fed into a machine learning model (and/or other type of inference generation model) to obtain the TIM to predict future measurements from data collectors.

In an embodiment, the TIM may also be obtained from another entity through a communication system. For example, a TIM may be obtained by another entity through training a twin machine learning model and providing the trained twin machine learning model to the data aggregator. In this scenario, the TIM obtained via another entity may or may not require training by the data aggregator.

At operation 306, a copy of the TIM may be distributed to various sources throughout the distributed environment (e.g., data collectors 100). Each copy of a TIM may generate identical inferences. Therefore, throughout the distributed environment, data aggregator 102 and each source hosting a copy of the TIM may obtain identical inferences throughout the process of data collection (and/or other processes).

In an embodiment, the copy of the trained TIM may be distributed by data aggregator 102 to data collectors 100 throughout the distributed environment via a communication system (e.g., communication system 101). For example, a copy of the trained TIM may be distributed to various data collectors by data aggregator 102 as part of the process of setting up a new distributed environment for data collection (and/or other purposes). In addition, a copy of the trained TIM may be distributed to various data collectors by data aggregator 102 as part of the process of adding or replacing one or more data collectors in a distributed environment.

In an embodiment, hosting and operating the AIM may require more computing resources than hosting and operating the TIM and, as a result, the inferences generated by the AIM may be more accurate than the inferences generated by the TIM. By hosting a copy of the TIM rather than the AIM, the sources (e.g., the data collectors) throughout the distributed environment may require less computational overhead. In order to allow the data collectors to access more accurate inferences (e.g., inferences generated by the AIM), the data aggregator may transmit an inference difference (e.g., a difference between the AIM and TIM inferences) to the data collectors as described below. Refer to operations 318-319 in FIG. 3E for additional details regarding the use of inference differences by the data collectors to access AIM inferences.

Turning to FIG. 3C, a flow diagram illustrating a method of performing reduced-size data transmission in accordance with an embodiment is shown. FIG. 3C may be a continuation of the method illustrated in 3B and the operations in 3C may be an expansion of operation 301 in FIG. 3A.

At operation 307, an AIM inference may be obtained. The AIM inference may be generated using the trained AIM. The AIM inference may be a prediction of data based on measurements performed by a data collector throughout a distributed environment. The AIM inference may be generated without the data aggregator having access to the measurements from the data collector.

In an embodiment, the AIM inference is generated by the AIM hosted by the data aggregator. In a second scenario, the AIM inference may be generated by a copy of the AIM hosted by another entity (e.g., a second data aggregator) and transmitted to data aggregator 102 via a communication system (e.g., communication system 101).

At operation 308, a TIM inference may be obtained. The TIM inference may be generated using the trained TIM. The TIM inference may be a prediction of data based on measurements performed by a data collector throughout a distributed environment. The TIM inference may be generated without the data aggregator having access to the measurements from the data collector.

In an embodiment, the TIM inference may be generated by the copy of the TIM hosted by the data aggregator. In a second scenario, the TIM inference may be generated by a copy of the TIM hosted by another entity (e.g., a second data aggregator) and transmitted to data aggregator 102 via a communication system (e.g., communication system 101).

As previously mentioned, the TIM may consume fewer computing resources than the AIM during operation and, consequently, may generate less accurate inferences. In order to provide the data collectors with the more accurate inferences (e.g., the AIM inferences) the data aggregator may obtain an inference difference as described below.

At operation 309, an inference difference may be obtained by the data aggregator. An inference difference may be any reduced-size representation of inferences based on: (i) an AIM inference obtained by the data aggregator and (ii) a TIM inference obtained by the data aggregator. The AIM inference used to obtain the inference difference may be generated by the AIM as described above. The TIM inference used to obtain the inference difference may be generated by the copy of the TIM hosted by the data aggregator as described above. Both the AIM inference and the TIM inference may be intended to match data obtained via a measurement performed by a data collector (e.g., data collector 100A). Refer to FIG. 2A for more details and examples regarding inference differences.

At operation 310, the inference difference may be transmitted to the data collectors. Any number of inference differences may be transmitted by the data aggregator to any number of data collectors throughout a distributed environment. For example, requests for the inference differences may be sent by the data collectors and the data aggregator may provide the inference differences to the data collectors in response to the requests. Such messages and/or data may be passed via a communication system operably connecting the data collector and the data aggregator.

In an embodiment, the inference differences may be provided by the data aggregator to the data collectors. The data aggregator may be programmed to provide inference differences at established time intervals, at varying time intervals, and/or via other modalities. For example, the data aggregator may be programmed to provide an inference difference once every minute, every hour, every day, etc. By transmitting a reduced-size representation of the inferences, the amount of data transmitted via the communication system may be minimized and, therefore, the consumption of network bandwidth and consumption of power by the data collector for transmission purposes may be reduced.

In an embodiment, the inference differences may be used by the data collectors to reconstruct the (more accurate) AIM inferences. The data collectors may use these reconstructed AIM inferences (identical to the AIM inferences obtained by the data aggregator) to generate a data difference. Refer to operations 318-321 in FIG. 3E for additional details regarding the use of inference differences by the data collectors to obtain data differences. The data differences may be used by the data aggregator to reconstruct data obtained via measurements performed by the data collectors as described below.

Transmitting the inference difference may require less data transmission than transmitting AIM inferences (e.g., due to the similarity of AIM and TIM inferences), but may still enable data collectors to have access to AIM inferences via inference reconstruction.

In an embodiment, data aggregator 102 may synchronize the transmission of the inference difference to ensure receipt by the data collector at established time intervals. The time intervals may be static, dynamic, determined by a user and/or an external entity through communication system 101. In addition, the time intervals may be established based on the computational requirements of data aggregator 102 and/or data collectors 100. For example, the time required to obtain and transmit an inference difference by data aggregator 102 may be taken into account to ensure transmission of the inference difference prior to the data collector obtaining a data difference. Synchronization of operations for data aggregator 102 and/or data collectors 100 may be performed via other methods and for other reasons without departing from embodiments disclosed herein.

At operation 311, a data difference may be obtained. The data difference may be any reduced-size representation of data (which the AIM and TIM attempt to predict) based on: (i) a measurement performed by a data collector (e.g., data collector 100A) and (ii) an inference obtained by the data collector (e.g., data collector 100A). The inference used to obtain the data difference may be a reconstructed AIM inference based on: (i) the inference difference from the data aggregator and (ii) a TIM inference obtained from the copy of the TIM hosted by the data collector. Refer to operations 319-321 in FIG. 3E for additional details regarding the reconstruction of AIM inferences and generation of data differences by the data collector.

At operation 312, the data aggregator may reconstruct data from the data collectors using: (i) data differences obtained from the data collector and (ii) AIM inferences generated by the AIM hosted by the data aggregator (e.g., the AIM inferences being identical to reconstructed AIM inferences obtained by the data collectors). By reconstructing data from the data collectors, the data aggregator may be able to obtain exact (or substantially similar) measurements from the data collectors without exchanging the measurements over communication system 101. By doing so, the communication network bandwidth may be conserved and power consumption due to data transmission may be reduced throughout the distributed environment.

For example, data aggregator 102 may obtain a data difference from a temperature sensor including 4 bits of compressed information. Data aggregator 102 may perform a data expansion step to access the bit sequence for this data. The bit sequence may be 00000001, which may correspond to a data difference of 0.5° C. Data aggregator 102 may obtain an AIM inference of 35.5° C. from the AIM hosted by the data aggregator. In this scenario, the temperature sensor may have reconstructed the AIM inference locally and may have access to an identical AIM inference. Refer to operation 319 in FIG. 3E for additional details regarding reconstruction of AIM inferences by the data collector.

In order to obtain the exact value of the temperature measurement, the data aggregator may utilize the following formula: data difference=temperature measurement−AIM inference (e.g., value difference). Therefore, the data aggregator may calculate a temperature measurement of 36.0° C. by adding the AIM inference and the data difference. The data aggregator may store this temperature measurement in reconstructed data repository 210. By performing this process, the data aggregator may have access to exact temperature measurements performed by the temperature sensor without transmitting actual temperature measurements across communication system 101.

Reconstructed data may also be obtained using a bit-wise calculation as described in further detail at operation 321 in FIG. 3E with respect to obtaining data differences, or by other methods without departing from embodiments disclosed herein. By transmitting the compressed data difference as a method of data collection, a reduced amount of data may be transmitted across communication system 101 and, therefore, network bandwidth and power consumption may be minimized throughout the distributed environment.

While described above as utilizing both complex and simple inference models (e.g., AIMs and TIMs), data aggregator 102 may host only an AIM and the TIM may not be hosted by data aggregator 102 or data collectors 100. In this scenario, the data collectors 100 may obtain AIM inferences from data aggregator 102 and use these AIM inferences to generate a data difference based on: (i) data obtained via measurements obtained by data collectors 100 and (ii) AIM inferences obtained from data aggregator 102. The data difference may then be obtained by the data aggregator and used to reconstruct data from data collectors 100 using the AIM inferences. While this approach may lead to an increased amount of data transmitted over communication system 101 (e.g., due to AIM inferences requiring larger quantities of data to be transmitted when compared to the quantities of data required to transmit inference differences), the data transmission load may be placed on the previously mentioned under-utilized uplink pathways (e.g., data aggregator to data collector). Consequently, network bandwidth across the downlink (e.g., data collector to data aggregator) pathways may still be conserved using this approach while reducing the computational burden on data collectors 100 (e.g., by not needing to host a TIM). Data aggregation via reconstruction may be performed via other methods without departing from embodiments disclosed herein.

At operation 313, the AIM inferences, TIM inferences, inference differences, and data differences may be discarded. AIM inferences, TIM inferences, inference differences, and data differences may be discarded by data aggregator 102 following the process of data reconstruction in order to reduce storage consumption by the data aggregator.

As discussed below, the amount of information (e.g., the number of bits) stored in the data difference may be used by data aggregator 102 to determine accuracy of the AIM and/or the TIM.

Turning to FIG. 3D, a flow diagram illustrating a method of correcting a method of reduced-size data transmission in accordance with an embodiment is shown. FIG. 3D may be a continuation of the method illustrated in 3C and the operations in FIG. 3D may be an expansion of operation 302 in FIG. 3A.

At operation 314, it is determined whether the data difference falls below an established threshold (or a dynamically determined threshold, or other type of metric). The threshold may be obtained from a user, from another entity through a communication system, or via other methods. If the data difference falls below the established threshold, the method may end following operation 314. If the data difference falls outside the established threshold, the method may proceed to operation 315.

At operation 315, the difference falls outside the established threshold. In this scenario, the AIM and/or TIM may be updated. The AIM and/or TIM may be updated in order to more accurately predict data based on measurements performed by the data collectors. The AIM and/or TIM may be updated using a second set of training data. The second set of training data may be obtained from reconstructed data stored by the data aggregator and/or data based on measurements performed by the data collectors. The data aggregator may request a second set of training data from the data collectors or obtain this second set of training data from another entity through a communication system operably connecting the data collector and the data aggregator.

The method may end following operation 315.

While described above with respect to data differences, similar processes may be performed for inference differences, which may trigger updating of TIMs and/or AIMS.

Turning to FIG. 3E, a flow diagram illustrating a method of data collection in accordance with an embodiment is shown.

At operation 316, a copy of a trained TIM may be obtained by the data collector. The TIM may be implemented with, for example, a machine learning model. The TIM may generate inferences that predict future data obtained by data collectors without having access to the data obtained by the data collectors.

In an embodiment, the copy of the TIM may be obtained from the data aggregator via a communication system (e.g., communication system 101). In a second scenario, the copy of the TIM may be obtained from another entity (e.g., a second data aggregator) operably connected to the data collector via a communication system.

At operation 317, a TIM inference may be obtained by the data collector. The TIM inference may be generated using the copy of the trained TIM hosted by the data collector. The TIM inference may be a prediction of data based on measurements performed by the data collector.

In an embodiment, the TIM inference may be generated by a copy of the TIM hosted by another entity (e.g., the data aggregator) and transmitted to the data collector via a communication system.

At operation 318, an inference difference may be obtained by the data collector. An inference difference may be any reduced-size representation of inferences based on: (i) an AIM inference obtained by the data aggregator and (ii) a TIM inference obtained by the data aggregator. The AIM inference used to obtain the inference difference may be generated by the AIM hosted by the data aggregator. The TIM inference used to obtain the inference difference may be generated by the copy of the TIM hosted by the data aggregator. Both the AIM inference and the TIM inference may be intended to match data obtained via a measurement performed by a data collector (e.g., data collector 100A). Refer to FIG. 2A for more details and examples regarding inference differences.

In an embodiment, the inference difference is obtained by receiving it from a data aggregator. For example, the data aggregator may generate the inference difference and provide the inference difference to the data collector.

At operation 319, an AIM inference may be reconstructed by the data collectors. Data collectors may reconstruct AIM inferences using: (i) inference differences obtained from the data aggregator and (ii) TIM inferences generated by the copy of the TIM hosted by the data collector. By reconstructing AIM inferences, the data collector may be able to obtain an exact copy of the AIM inference obtained by the data aggregator without exchanging AIM inferences over communication system 101 or operating an AIM locally. In order to reduce network transmissions, data collectors may use the reconstructed AIM inferences to obtain reduced-size representations of measurements (e.g., data differences) performed by the data collectors. Refer to operation 321 in FIG. 3E for additional details regarding data differences.

For example, a data collector may be a temperature sensor positioned in an industrial environment to collect temperature measurements of that environment. The temperature sensor may obtain an inference difference from a data aggregator including 3 bits of compressed information. The temperature sensor may perform a data expansion step to access the bit sequence for this data. The bit sequence for the inference difference may be 01000010. The temperature sensor may obtain a TIM inference from a copy of a TIM hosted by the data collector. The TIM inference may correspond to a bit sequence of 11010110.

In order to obtain the bit sequence associated with the AIM inference, the data collector may utilize the following formula: inference difference bit sequence=AIM inference bit sequence−TIM inference bit sequence (e.g., bit-wise difference). Therefore, the data collector may calculate an AIM inference bit sequence of 10010100. The data collector may use this reconstructed AIM inference (identical to the AIM inference obtained by the data aggregator) to obtain a reduced-size representation of data (e.g., a data difference) to transmit to the data aggregator as described below.

Reconstructed AIM inferences may also be obtained using a value-based calculation as described previously with respect to operation 312 in FIG. 3C regarding the reconstruction of data from data collectors, or by other methods without departing from embodiments disclosed herein.

At operation 320, data is obtained by the data collector. The data may be based on measurements performed by the data collector. The data may represent some characteristic of an ambient environment. The data may be any type or quantity of data including, for example, temperature data, pH data, humidity data, etc. The data may be obtained by the data collector continuously, at established time intervals, and/or via other modalities.

At operation 321, a data difference is obtained. A data difference may be any reduced-size representation of data based on: (i) a measurement performed by a data collector (e.g., data collector 100A) and (ii) an inference obtained by the data collector (e.g., data collector 100A). The inference used to obtain the difference may be a reconstructed AIM inference based on: (i) the inference difference from the data aggregator and (ii) a TIM inference obtained from the copy of the TIM hosted by the data collector. The reconstructed AIM inference used to obtain the data difference may be intended to match the data obtained via a measurement performed by a data collector (e.g., data collector 100A).

For example, one data collector may be a temperature sensor positioned in an industrial environment to monitor the temperature of that environment. The data collector may perform a measurement and collect a temperature reading at a given time $(t_1)$ of 36.5° C. The data collector may obtain a reconstructed AIM inference intended to predict the temperature reading at $t_1$ performed by the temperature sensor. The reconstructed AIM inference obtained by the temperature sensor may be 36.0° C. (identical to the AIM inference obtained by the data aggregator).

Continuing with the above example, the temperature sensor may perform a data minimization step in order to decrease the bits needed to represent the data and, therefore, decrease the amount of data transmitted across communication system 101 during data collection. One example of a data minimization step may be data compression. For example, different bit sequences may compress to different numbers of bits. The temperature reading may have the following bit sequence: 11011010. Compressing the temperature reading bit sequence may result in 8 bits of information transmitted over communication system 101. The reconstructed AIM inference may have the following bit sequence: 11001010. Compressing the reconstructed AIM inference may also result in 8 bits of information transmitted over communication system 101. In order to reduce the size of the transmission, the temperature sensor may utilize the following formula to generate a data difference bit sequence: data difference bit sequence=temperature reading bit sequence−reconstructed AIM inference bit sequence (e.g., bit-wise difference operation). Therefore, the temperature sensor may calculate the data difference bit sequence as 00010000. Compressing the data difference bit sequence may result in 2 bits of information transmitted over communication system 101. Therefore, the data aggregator may obtain 2 bits of information rather than 8 from the temperature sensor during data collection. Consequently, the amount of data transmitted over communication system 101 may be minimized and, therefore, network bandwidth and power consumption may be reduced.

In an embodiment, the data collector may treat the data difference as a value-based data difference as described with respect to operation 312 in FIG. 3E regarding the reconstruction of data from the data collectors, in which the numerical value of the measurement and inference may be subtracted rather than the bit sequences.

While described herein with respect to compression, other data reduction techniques may also be applied to further reduce the quantity of data necessary to convey information across a distributed system. For example, quantization/discretization of data may be used (e.g., rounding) to further reduce the quantity of data used to convey information.

At operation 322, the data difference may be transmitted to the data aggregator. Any number of data differences may be transmitted by the data collector to the data aggregator. For example, requests for the data differences may be received by the data collector and the data collectors may provide the data differences to the data aggregator in response to the requests. Such messages and/or data may be passed via a communication system operably connecting the data collector and the data aggregator.

In an embodiment, the data difference may be provided by the data collector to the data aggregator. The data collectors may be programmed to provide data differences at established time intervals or other modalities, as noted above. For example, the data collectors may be programmed to provide a data difference once every minute. By doing so, the amount of data transmitted via the communication system may be minimized and, therefore, the consumption of network bandwidth and consumption of power by the data collector for transmission purposes may be reduced.

At operation 323, the data differences, data, TIM inferences, reconstructed AIM inferences, and inference differences may be discarded. The data collector may discard the data differences, data, TIM inferences, reconstructed AIM inferences, and inference differences following transmission of data differences to the data aggregator. In a second scenario, the data collector may discard the data differences, data, TIM inferences, reconstructed AIM inferences, and inference differences upon receiving a command from the data aggregator. Discarding the data differences, data, TIM inferences, reconstructed AIM inferences, and inference differences may reduce storage consumption by the data collector.

The method may end following operation 323.

Turning to FIGS. 4A-4M, these figures may illustrate a system similar to that of FIG. 1 in accordance with an embodiment. FIGS. 4A-4M may show actions performed by the system over time. The system may include potential of hydrogen (pH) sensor 400 and reaction vessel monitoring system 401. pH sensor 400 may be operably connected to reaction vessel monitoring system 401 via communication system 101. Communication system 101 may include limited communication bandwidth and may serve a large number of different components (not shown). Consequently, it may be desirable to limit communications between pH sensor 400 and reaction vessel monitoring system 401 to efficiently marshal the limited communication bandwidth so that it is less likely that components of the system are impaired for lack of access to communication bandwidth.

Figure 4A:
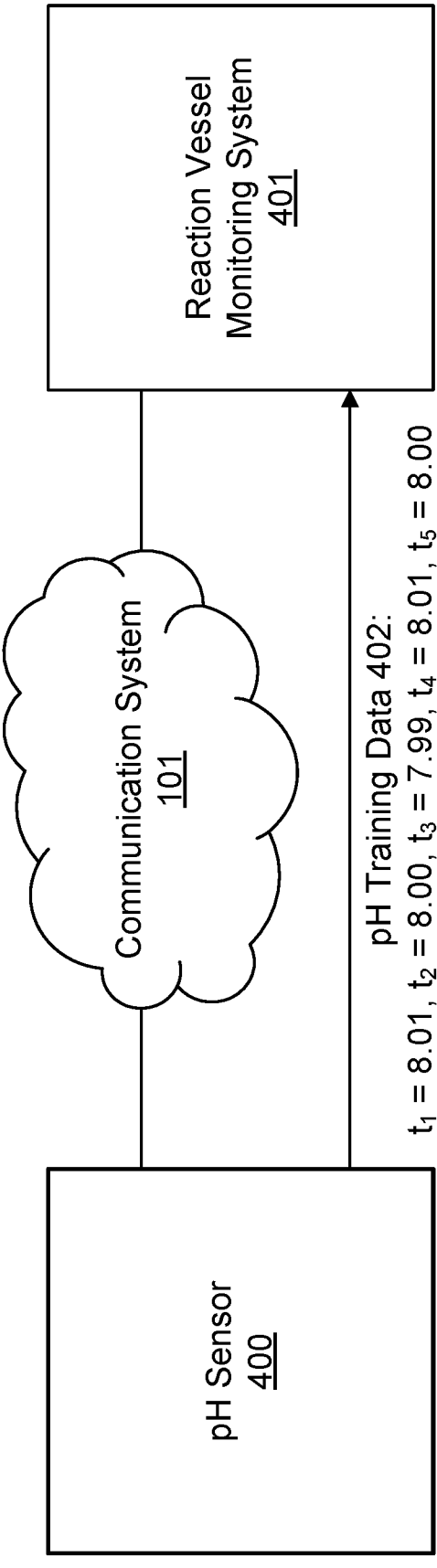

Turning to FIG. 4A, consider a scenario where pH sensor 400 collects pH training data 402 from a reaction vessel. pH training data 402 may be collected at various time intervals (e.g., $t_1$, $t_2$, etc.) over the course of one hour and may include the following: $t_1$=8.01, $t_2$=8.00, $t_3$=7.99, $t_4$=8.01, $t_5$=8.00 (e.g., on a scale of 0 to 14 with a score of 7 indicating neutrality, scores below 7 indicating acidity, and scores above 7 indicating base conditions). Reaction vessel monitoring system 401 may obtain pH training data 402 for the purpose of training an AIM and/or a TIM to predict future pH measurements obtained by pH sensor 400.

Figure 4B:
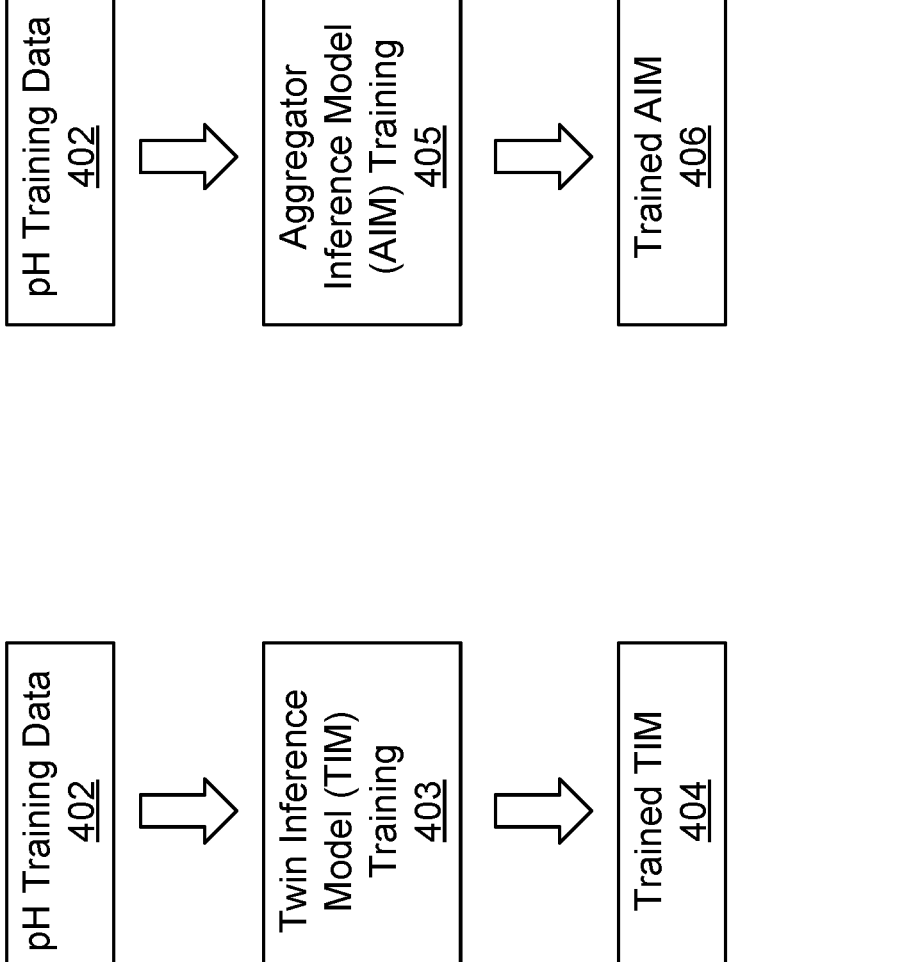

Reaction vessel monitoring system 401 may train an AIM and/or a TIM based on pH training data 402 to obtain a trained AIM and/or TIM. Turning to FIG. 4B, an AIM training process is illustrated on the right-hand side of the figure and a TIM training process is illustrated on the left-hand side of the figure. During these training processes, pH training data 402 may be used to perform a TIM training 403 process to obtain a trained TIM 404 and an AIM training

405 process to obtain a trained AIM 406 respectively. For example, reaction vessel monitoring system 401 may perform portions of the methods illustrated in FIG. 3A-3D to obtain trained TIM 404 and trained AIM 406.

Figure 4C:
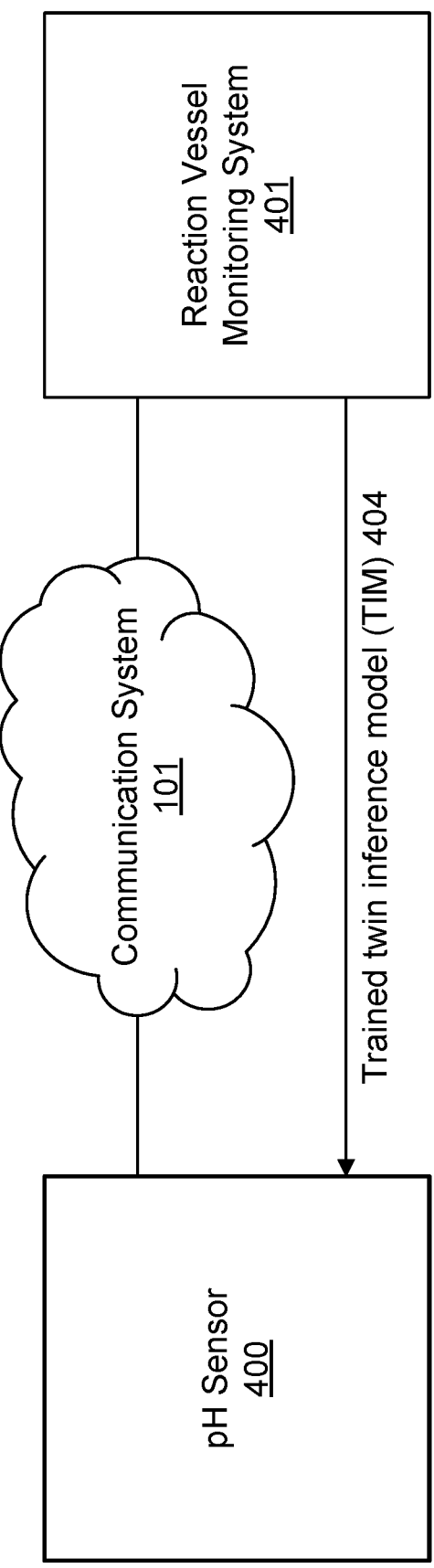

Turning to FIG. 4C, reaction vessel monitoring system 401 may distribute a copy of the trained TIM 404 to pH sensor 400. A second copy of the trained TIM 404 may be hosted by the reaction vessel monitoring system. Therefore, pH sensor 400 and reaction vessel monitoring system 401 may have access to identical TIM inferences generated by each copy of the TIM as described below.

Figure 4D:
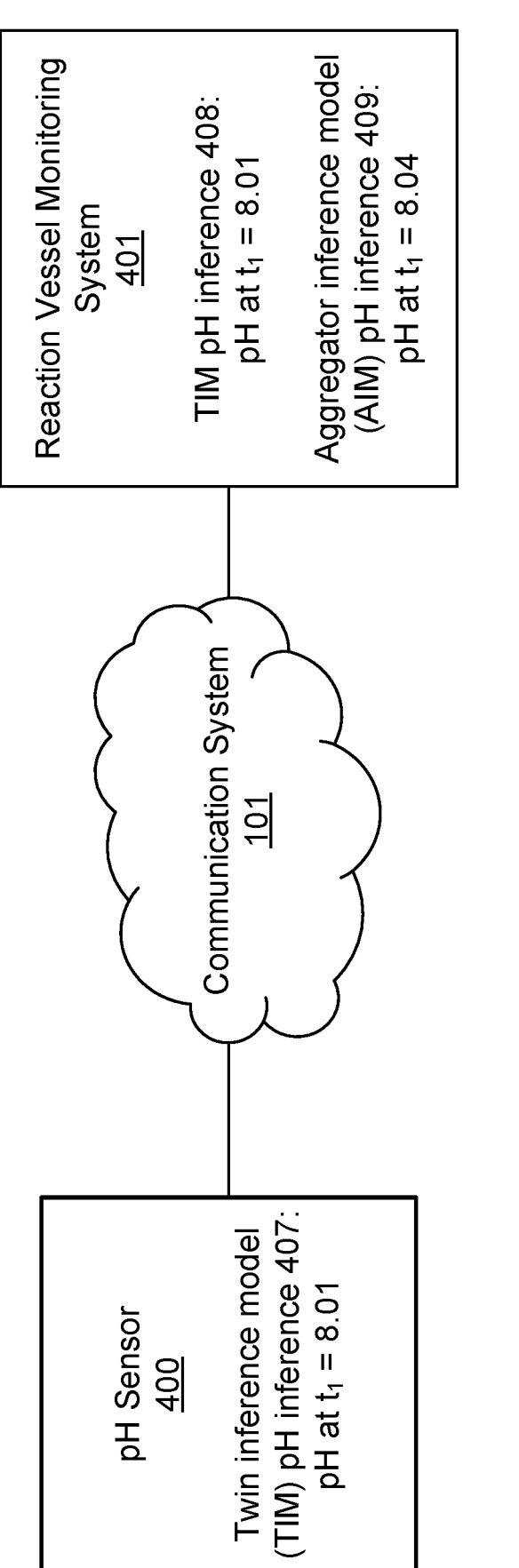

Turning to FIG. 4D, pH sensor 400 and reaction vessel monitoring system 401 may obtain identical TIM pH inferences (e.g., TIM pH inference 407 and TIM pH inference 408) at a given time. The pH inferences may be predictions of pH measurements performed by pH sensor 400. At $t_1$, the copy of the TIM hosted by the data collector may generate TIM pH inference 407 of 8.01. At $t_1$, the copy of the TIM hosted by the data aggregator may generate TIM pH inference 408 of 8.01. pH sensor 400 and reaction vessel monitoring system 401 may both access this inference without transmitting the inference via communication system 101.

Reaction vessel monitoring system 401 may also obtain AIM pH inferences at a given time using the trained AIM 406 hosted by the data aggregator. The AIM pH inference 409 at $t_1$ may be 8.04. The trained AIM 406 may consume more computing resources than the trained TIM 404 during operation and, therefore, the AIM pH inference 409 may be more accurate than the TIM pH inference 408 (identical to TIM pH inference 407). In order to allow pH sensor 400 to access the (more accurate) AIM pH inference 409, reaction vessel monitoring system 401 may transmit an inference difference (a difference between TIM pH inference 408 and AIM pH inference 409) to the pH sensor 400 as described below.

Turning to FIG. 4E, reaction vessel monitoring system may determine a bit sequence for the TIM pH inference 408 and the AIM pH inference 409. The TIM pH inference bit sequence 410 may be 10011011 and the AIM pH inference bit sequence may be 10101011.

Figure 4F:
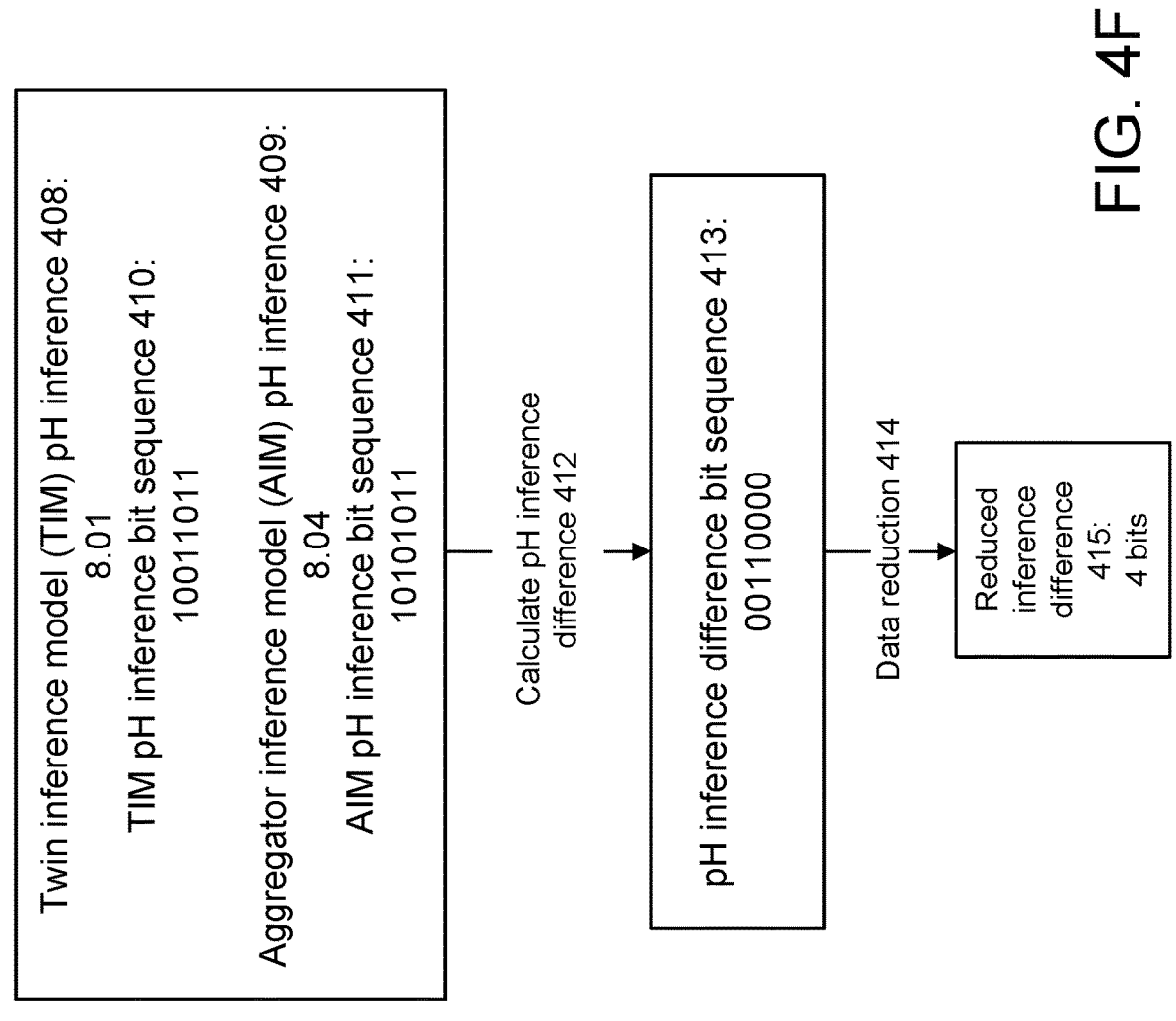

Turning to FIG. 4F, reaction vessel monitoring system 401 may obtain an inference difference based on: (i) the TIM pH inference bit sequence 410 and (ii) the AIM pH inference bit sequence 411. Reaction vessel monitoring system 401 may utilize the following formula to perform a calculate pH inference difference 412 step: pH inference difference bit sequence 413=AIM pH inference bit sequence 411–TIM pH inference bit sequence 410. Reaction vessel monitoring system 401 may obtain a pH inference difference bit sequence 413 of 00110000. Reaction vessel monitoring system 401 may perform a data reduction 414 step in order to reduce the number of bits required to represent the pH inference difference bit sequence 413. Data reduction 414 may involve data compression and/or other data reduction methods. Following data reduction 414, reaction vessel monitoring system may obtain reduced inference difference 415 containing 4 bits of information.

Figure 4G:
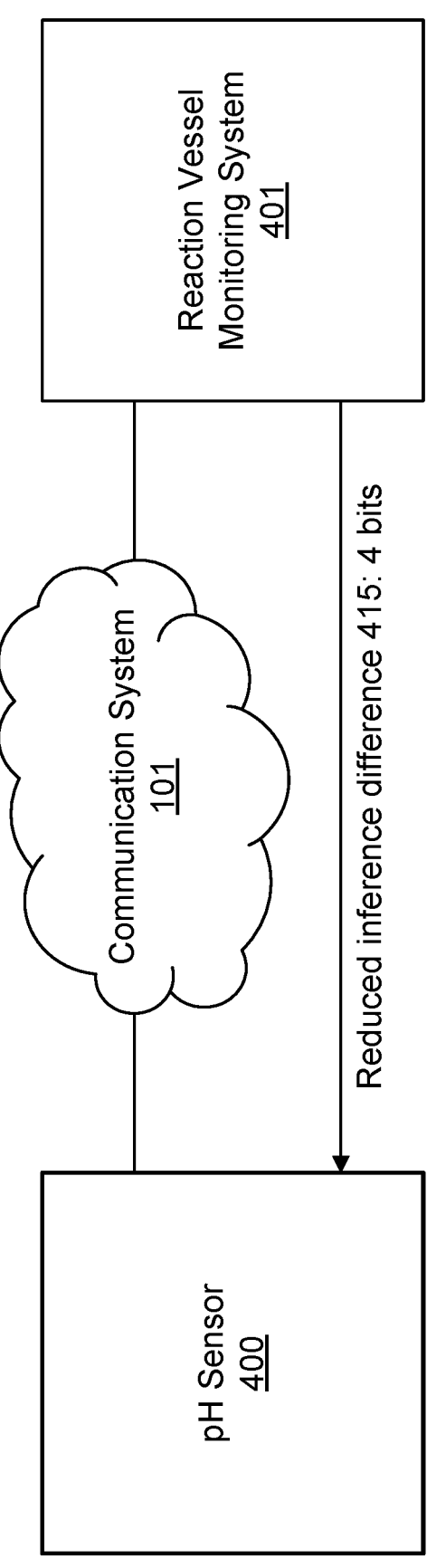

Turning to FIG. 4G, reaction vessel monitoring system 401 may transmit reduced inference difference 415 to pH sensor 400 in order to allow pH sensor 400 to reconstruct AIM pH inference 409 as described below.

Figure 4H:
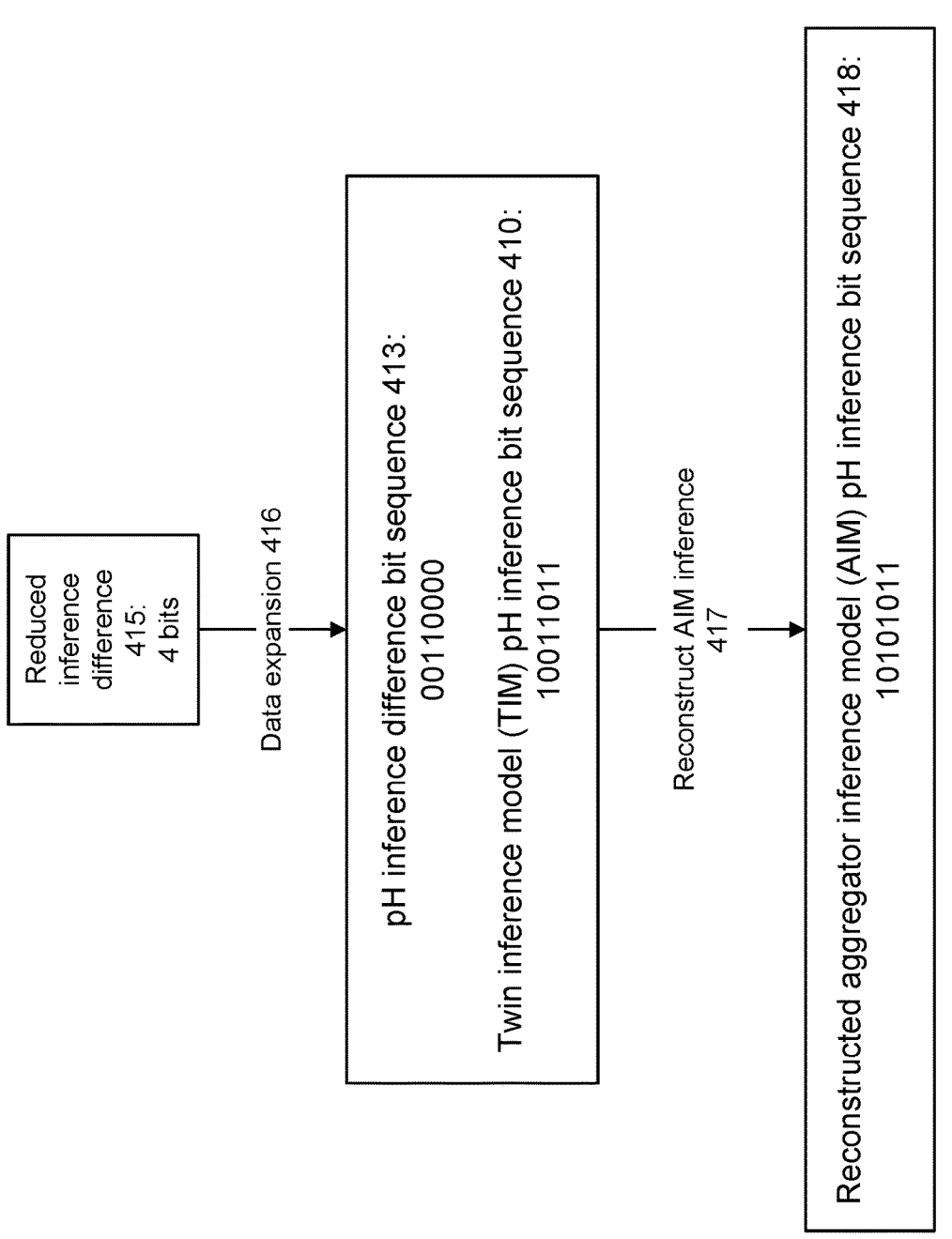

Turning to FIG. 4H, pH sensor 400 may obtain reconstructed AIM pH inference bit sequence 418 using: (i) pH inference difference bit sequence 413 obtained from reaction vessel monitoring system 401 and (ii) TIM pH inference bit sequence 410 obtained by the data collector. Reconstructed AIM pH inference bit sequence 418 may be identical to AIM pH inference bit sequence 411. pH sensor 400 may perform data expansion 416 on reduced inference difference 415 to obtain pH inference difference bit sequence 413 of 00110000. pH sensor 400 may utilize the following formula to perform a reconstruct AIM inference 417 step: pH inference difference bit sequence 413=reconstructed AIM pH inference bit sequence 418–TIM pH inference bit sequence 410. pH sensor 400 may obtain reconstructed AIM pH inference bit sequence 418 of 10101011 using this formula. By performing this process, pH sensor 400 may have access to the (more accurate) AIM pH inference 409 generated by the trained AIM 406 without transmitting AIM pH inference 409 over communication system 101. pH sensor 400 may use reconstructed AIM pH inference bit sequence 418 to obtain a reduced-size representation of data from pH sensor 400 as described below.

Figure 4I:
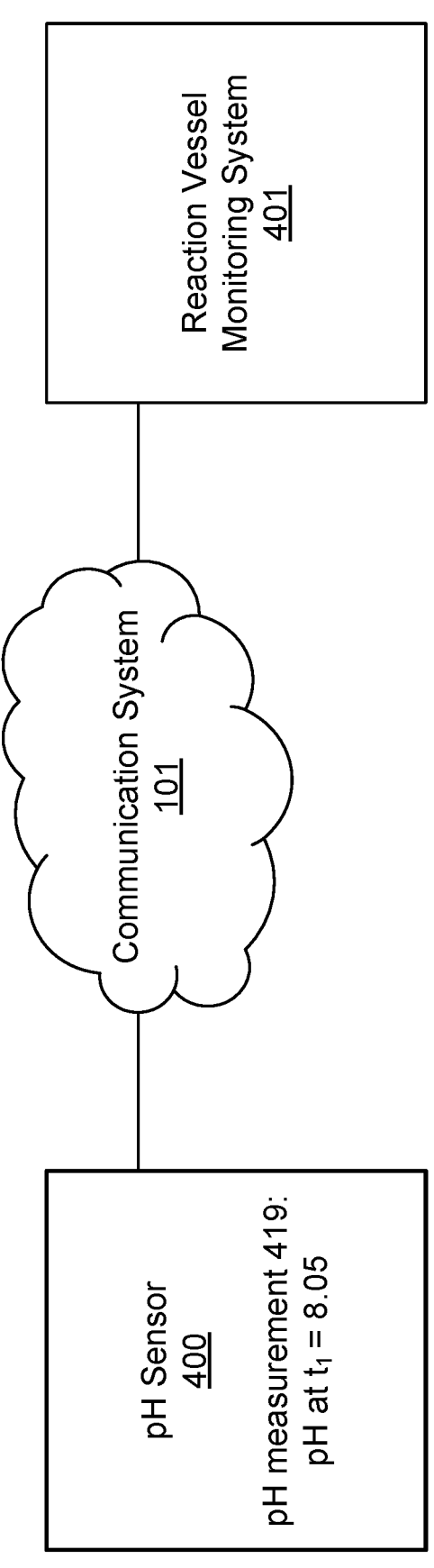

Turning to FIG. 4I, pH sensor 400 may obtain pH measurement 419. AIM pH inference 409, TIM pH inference 407, and TIM pH inference 408 may be intended to match this pH measurement 419. The pH measurement 419 at $t_1$ may be 8.05.

Figure 4J:
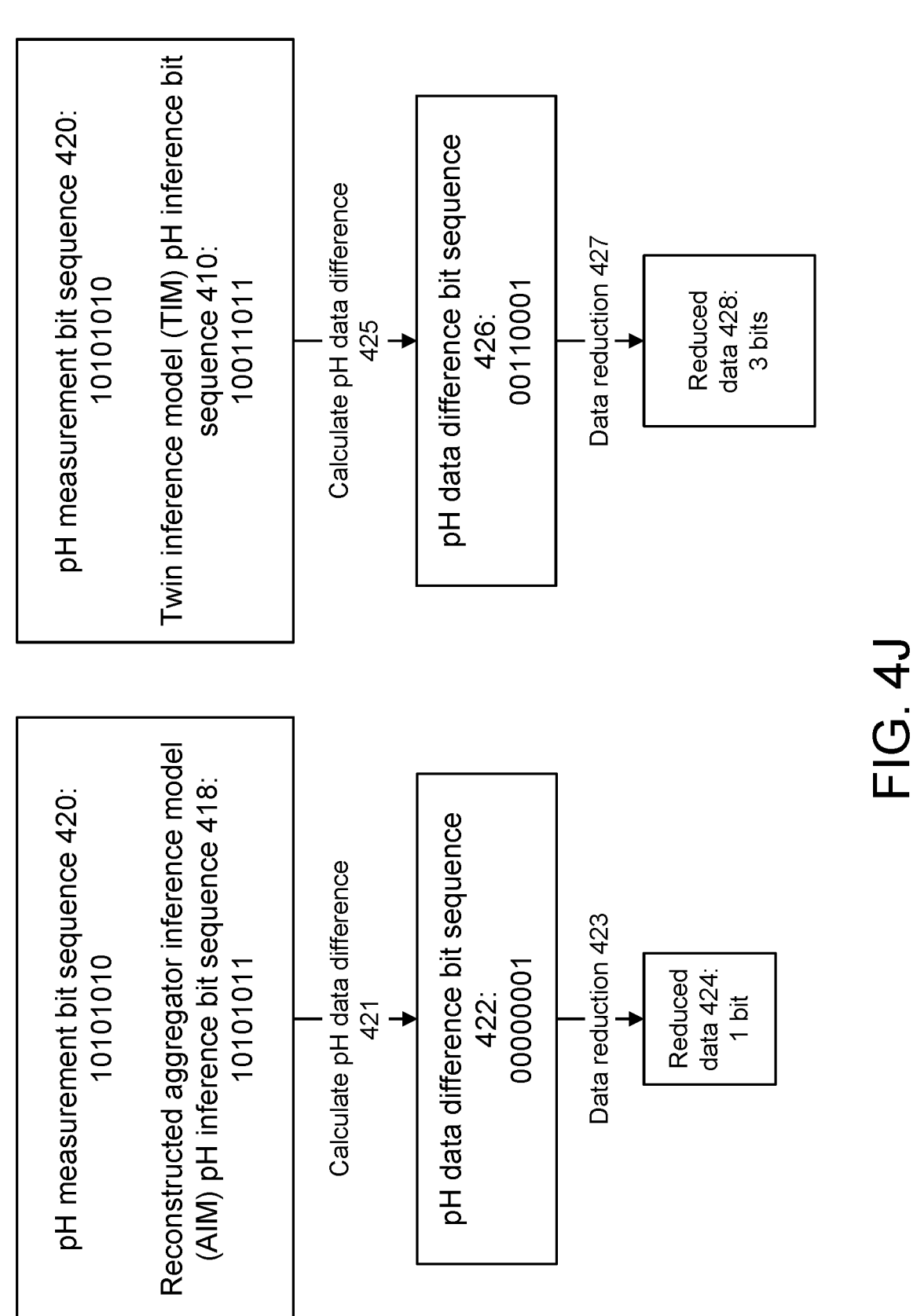

Turning to FIG. 4J, pH sensor 400 may generate pH measurement bit sequence 420 of 10101010 based on the pH measurement 419 of 8.05. In order to reduce the size of the information transmitted during data collection, pH sensor 400 may obtain pH data difference bit sequence 422 (a reduced-size representation of pH measurement bit sequence 420 using: (i) pH measurement bit sequence 420 and (ii) reconstructed AIM pH inference bit sequence 418. pH sensor 400 may use the following formula to perform a calculate pH data difference 421 step: pH data difference bit sequence 422=reconstructed AIM pH inference bit sequence 418–pH measurement bit sequence 420. pH sensor 400 may obtain a pH data difference bit sequence 422 of 00000001. In order to reduce the size of pH data difference bit sequence 422, pH sensor 400 may perform data reduction 423 to obtain reduced data 424. Reduced data 424 may contain 1 bit of information.

As mentioned previously, reconstructed AIM pH inference bit sequence 418 may be a more accurate prediction than TIM pH inference bit sequence 410. The right-hand side of FIG. 4F illustrates the same operations performed in order to calculate a pH data difference and compress the pH data difference using TIM pH inference bit sequence 410 instead of reconstructed AIM pH inference bit sequence 418. pH sensor 400 may perform a calculate pH data difference 425 step using the following similar formula: pH data difference bit sequence 426=TIM pH inference bit sequence 410–pH measurement bit sequence 420. In this scenario, pH data difference bit sequence 426 may be 00110001 and data reduction 427 may result in reduced data 428. Reduced data 428 may contain 3 bits of information. Consequently, the more accurate reconstructed AIM pH inference bit sequence 418 may allow for fewer bits of information transmitted over communication system 101 than the TIM pH inference bit sequence 410.

Figure 4K:
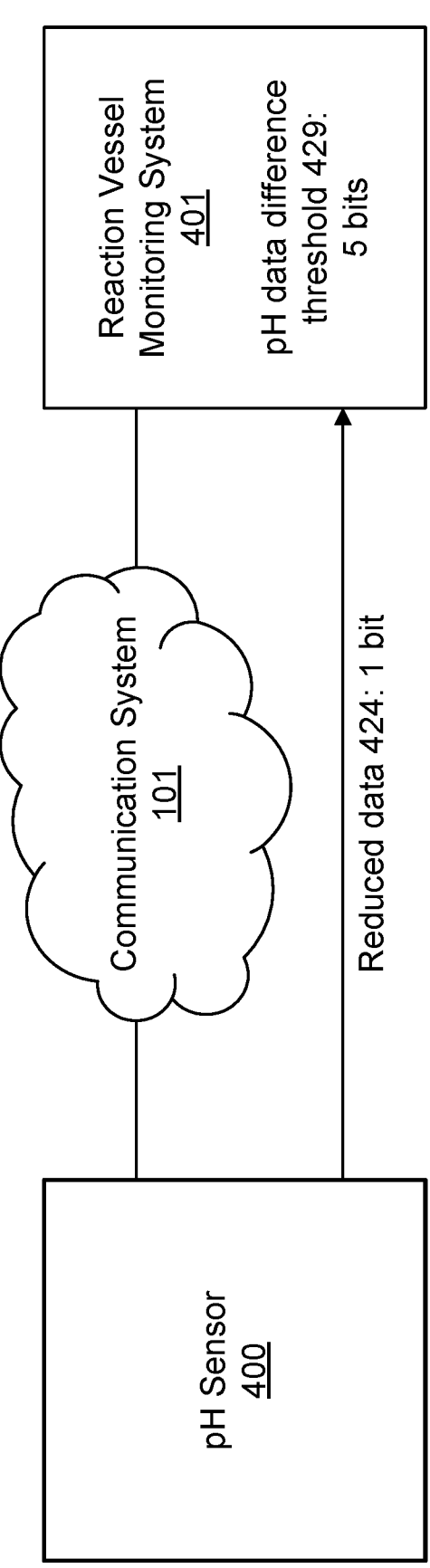

Turning to FIG. 4K, pH sensor 400 may transmit reduced data 424 to reaction vessel monitoring system 401. Reduced data 424 may be expanded by reaction vessel monitoring system 401 and reconstructed as data based on measurements performed by pH sensor 400. By doing so, the bandwidth use of communication system 101 may be reduced by not needing to carry information regarding pH measurement 419 from pH sensor 400 to reaction vessel monitoring system 401 while reaction vessel monitoring system 401 is still able to operate as though it had access to pH measurements 419. Refer to operation 312 in FIG. 3E for additional details regarding the reconstruction of data.

Reaction vessel monitoring system 401 may use an established threshold (e.g., pH data difference threshold 429) to determine accuracy of the AIM and/or TIM. For example, the pH data difference threshold 429 may be 5 bits. Therefore, if the amount of reduced data obtained by reaction vessel monitoring system 401 contains 5 bits or less, the reduced data falls below the threshold and the AIM and/or TIM may be treated as accurate. In this scenario, reduced data 424 may contain 1 bit of information and, therefore, the AIM and/or TIM may be treated as accurate.

Figure 4L:
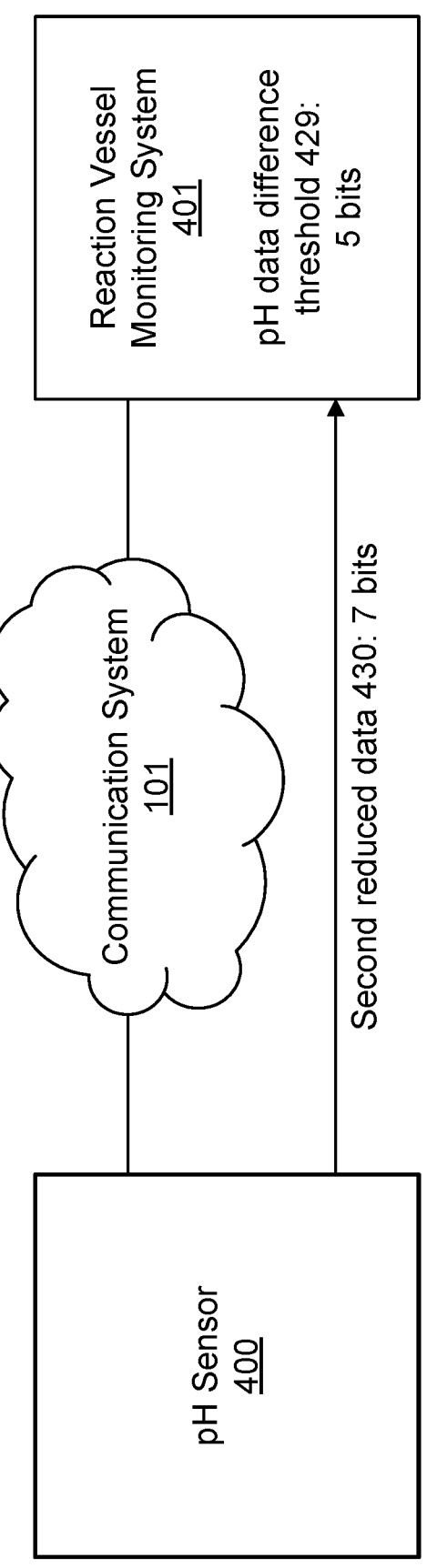

Turning to FIG. 4L, reaction vessel monitoring system 401 may obtain second reduced data 430 from pH sensor 400. Second reduced data 430 may contain 7 bits of information and, therefore, fall outside the pH difference threshold 429 of 5 bits. The AIM and/or TIM may be determined inaccurate, and reaction vessel monitoring system 401 may take corrective action in order to improve the accuracy of the AIM and/or TIM as described below.

Figure 4M:
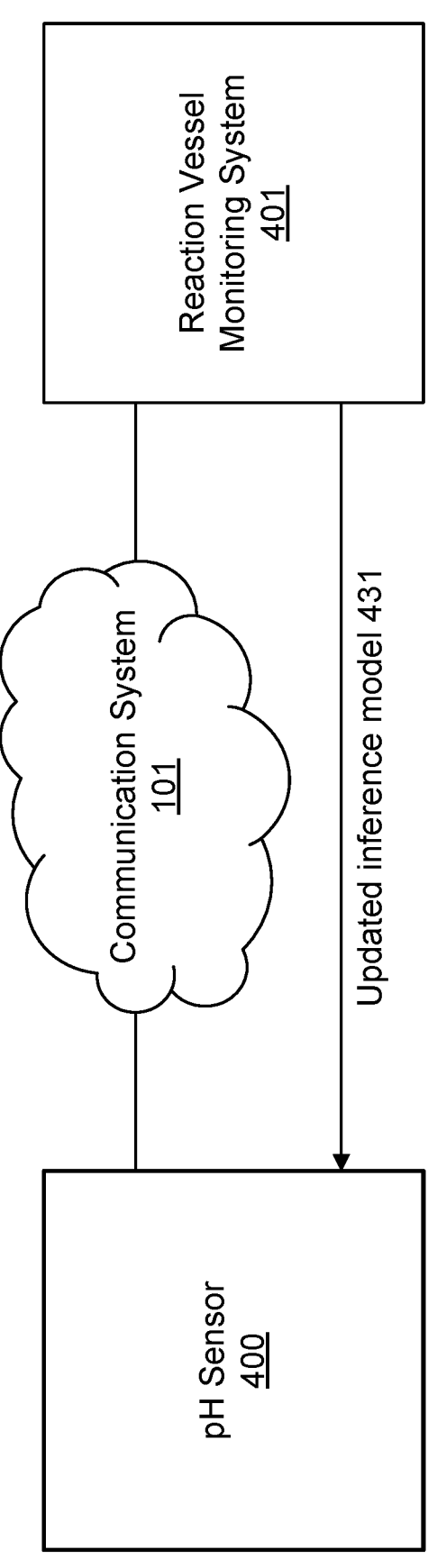

Turning to FIG. 4M, reaction vessel monitoring system 401 may take corrective action to improve the accuracy of the AIM and/or TIM by distributing an updated inference model 431 to pH sensor 400. Updated inference model 431 may be obtained by re-training the AIM and/or TIM using a second set of training data. The second set of training data may be obtained from pH sensor 400 and/or from the reconstructed data stored by reaction vessel monitoring system 401. By doing so, the accuracy of the AIM and/or TIM may be improved to predict future pH measurements. Consequently, the bandwidth use of communication system 101 may be reduced by minimizing the size of information transmitted from pH sensor 400 to reaction vessel monitoring system 401.

Figure 5:
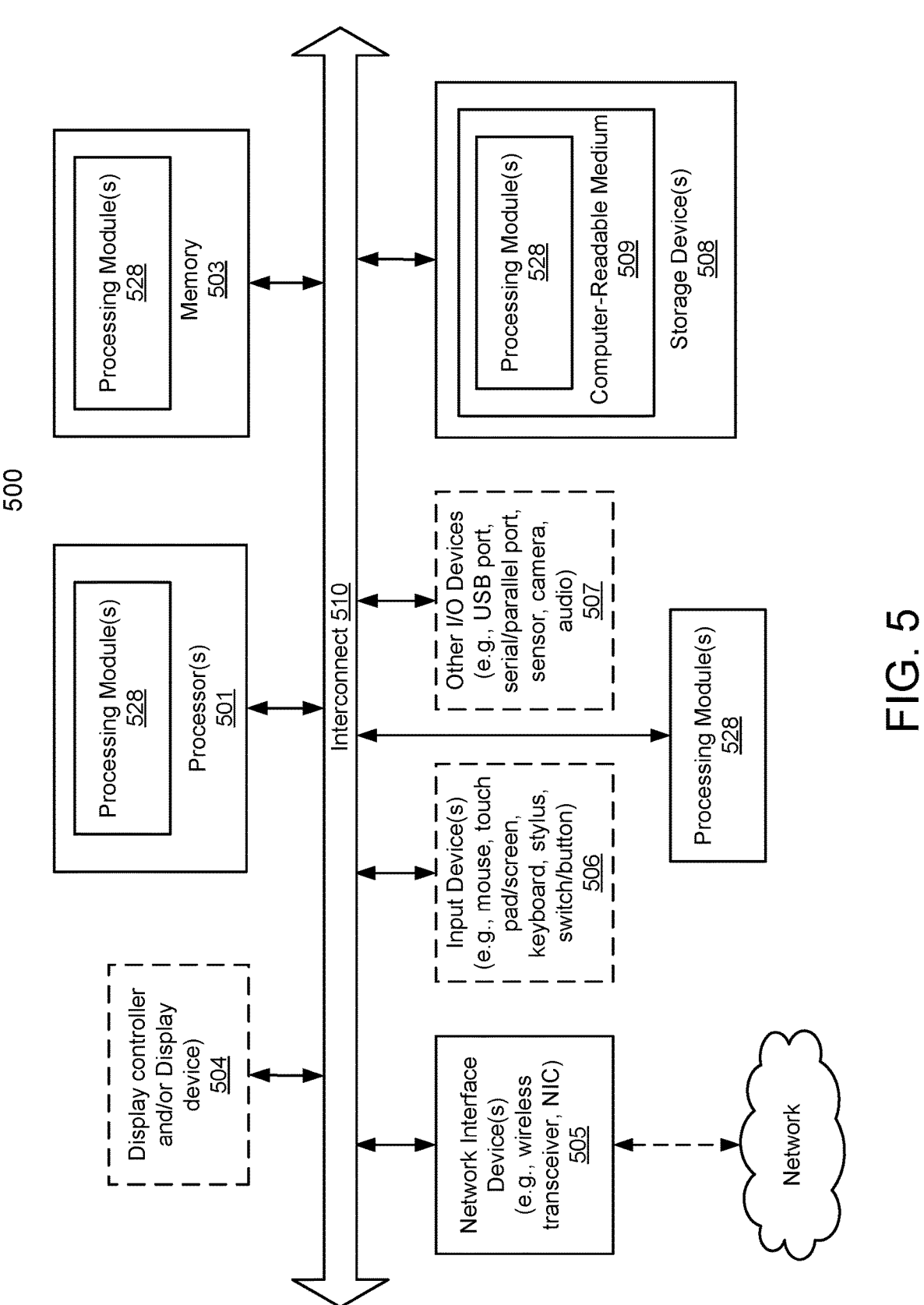
FIG. 5 shows a block diagram illustrating a data processing system in accordance with an embodiment.

Any of the components illustrated in FIGS. 1-4M may be implemented with one or more computing devices. Turning to FIG. 5, a block diagram illustrating an example of a data processing system (e.g., a computing device) in accordance with an embodiment is shown. For example, system 500 may represent any of data processing systems described above performing any of the processes or methods described above. System 500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 500 is intended to show a high level view of many components of the computer system. However, it is to be understood that additional components may be present in certain implementations and furthermore, different arrangement of the components shown may occur in other implementations. System 500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 500 includes processor 501, memory 503, and devices 505-507 via a bus or an interconnect 510. Processor 501 may represent a single processor or multiple processors with a single processor core or multiple processor cores included therein. Processor 501 may represent one or more general-purpose processors such as a microprocessor, a central processing unit (CPU), or the like. More particularly, processor 501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 501, which may be a low power multi-core processor socket such as an ultra-low voltage processor, may act as a main processing unit and central hub for communication with the various components of the system. Such processor can be implemented as a system on chip (SoC). Processor 501 is configured to execute instructions for performing the operations discussed herein. System 500 may further include a graphics interface that communicates with optional graphics subsystem 504, which may include a display controller, a graphics processor, and/or a display device.

Processor 501 may communicate with memory 503, which in one embodiment can be implemented via multiple memory devices to provide for a given amount of system memory. Memory 503 may include one or more volatile storage (or memory) devices such as random access memory (RAM), dynamic RAM (DRAM), synchronous DRAM (SDRAM), static RAM (SRAM), or other types of storage devices. Memory 503 may store information including sequences of instructions that are executed by processor 501, or any other device. For example, executable code and/or data of a variety of operating systems, device drivers, firmware (e.g., input output basic system or BIOS), and/or applications can be loaded in memory 503 and executed by processor 501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 500 may further include IO devices such as devices (e.g., 505, 506, 507, 508) including network interface device(s) 505, optional input device(s) 506, and other optional IO device(s) 507. Network interface device(s) 505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 506 may include a mouse, a touch pad, a touch sensitive screen (which may be integrated with a display device of optional graphics subsystem 504), a pointer device such as a stylus, and/or a keyboard (e.g., physical keyboard or a virtual keyboard displayed as part of a touch sensitive screen). For example, input device(s) 506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 507 may include an audio device. An audio device may include a speaker and/or a microphone to facilitate voice-enabled functions, such as voice recognition, voice replication, digital recording, and/or telephony functions. Other IO devices 507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 510 via a sensor hub (not shown), while other devices such as a keyboard or thermal sensor may be controlled by an embedded controller (not shown), dependent upon the specific configuration or design of system 500.

To provide for persistent storage of information such as data, applications, one or more operating systems and so forth, a mass storage (not shown) may also couple to processor 501. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 501, e.g., via a serial peripheral interface (SPI). This flash device may provide for non-volatile storage of system software, including a basic input/output software (BIOS) as well as other firmware of the system.

Storage device 508 may include computer-readable storage medium 509 (also known as a machine-readable storage medium or a computer-readable medium) on which is stored one or more sets of instructions or software (e.g., processing module, unit, and/or processing module/unit/logic 528) embodying any one or more of the methodologies or functions described herein. Processing module/unit/logic 528 may represent any of the components described above. Processing module/unit/logic 528 may also reside, completely or at least partially, within memory 503 and/or within processor 501 during execution thereof by system 500, memory 503 and processor 501 also constituting machine-accessible storage media. Processing module/unit/logic 528 may further be transmitted or received over a network via network interface device(s) 505.

Computer-readable storage medium 509 may also be used to store some software functionalities described above persistently. While computer-readable storage medium 509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 528, components and other features described herein can be implemented as discrete hardware components or integrated in the functionality of hardware components such as ASICS, FPGAs, DSPs or similar devices. In addition, processing module/unit/logic 528 can be implemented as firmware or functional circuitry within hardware devices. Further, processing module/unit/logic 528 can be implemented in any combination hardware devices and software components.

Note that while system 500 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing data collection in a distributed environment where data for a user is collected in a data aggregator of the distributed environment and the data is collected by a data collector operably connected to the data aggregator via a communication system, comprising:

obtaining, by the data aggregator, an inference difference, the inference difference being based on:

a first inference generated by an aggregator inference model hosted by the data aggregator, the first inference being a first prediction of the data collected by the data collector, and a second inference generated by a twin inference model hosted by the data aggregator, the second inference being a second prediction of the data collected by the data collector, wherein the first inference and the second inference are generated by the data aggregator while the data aggregator has not seen and has not received an actual copy of the data collected by the data collector over the communication system from the data collector;

obtaining, from the data collector, a data difference, the data difference being based on:

the data collected by the data collector, and a reconstructed inference, the reconstructed inference being generated by the data collector;

reconstructing, by the data aggregator, the data collected by the data collector as reconstructed data using the data difference and the first inference generated by the data aggregator, the data aggregator still having not seen and has not received the actual copy of the data over the communication system from the data collector while the data aggregator is reconstructing the reconstructed data; and providing the user with access to use of the reconstructed data, all the while the data aggregator still having not seen and has not received the actual copy of the data over the communication system from the data collector.

2. The method of claim 1, further comprising:

providing, to the data collector, a copy of the inference difference prior to obtaining the data difference, wherein the data difference is obtained by the data aggregator prior to the data collector being provided with the first inference and the second inference.

3. The method of claim 1, wherein the twin inference model hosted by the data aggregator is a copy of a second twin inference model hosted by the data collector, and the reconstructed inference being based on the inference difference generated by the data aggregator, wherein the inference difference is usable to obtain the first inference based on the second inference to which the data collector has access via the copy of the second twin inference model.

4. The method of claim 1, wherein obtaining the data difference further comprises:

making a determination that the data difference falls below a threshold; and based on that determination:

treating the aggregator inference model as being accurate.

5. The method of claim 1, wherein obtaining the data difference further comprise:

making a determination that the data difference falls outside of a threshold; and based on that determination:

treating the aggregator inference model as being inaccurate.

6. The method of claim 5, further comprising:

when the aggregator inference model is determined as being inaccurate:

updating the aggregator inference model using training data, the training data comprising a portion of other data obtained via a series of measurements performed by the data collector.

7. The method of claim 1, further comprising:

prior to obtaining the inference difference:

obtaining, by the data aggregator, the aggregator inference model, the aggregator inference model being trained using training data obtained from the data collector.

8. The method of claim 7, further comprising:

prior to obtaining the inference difference:

obtaining, by the data aggregator, the twin inference model using the training data; and distributing, by the data aggregator, a copy of the twin inference model to the data collector.

9. The method of claim 8, wherein the aggregator inference model is not provided to the data collector prior to the data difference being obtained by the data aggregator.

10. The method of claim 8, wherein the twin inference model consumes fewer computing resources than the aggregator inference model during operation.

11. The method of claim 8, wherein a value of the data difference decreases as accuracy of the aggregator inference model increases, and the value of the data difference increases as the accuracy of the aggregator inference model decreases.

12. The method of claim 11, wherein a quantity of bits necessary to communicate the data difference via the communication system decreases as the accuracy of the aggregator inference model increases.

13. The method of claim 9, wherein the reconstructed data is provided to the user to use while the actual copy of the data collected by the data collector is never actually transmitted via the communication system to the data aggregator.

14. The method of claim 1, wherein the data collector collects the data using a sensor that measures a characteristic of an ambient environment proximate to the data collector, the ambient environment proximate to the data collector being different from an ambient environment proximate to the data aggregator.

15. The method of claim 11, wherein the reconstructed data is based on the ambient environment proximate to the data collector and is different from the ambient environment proximate to the data aggregator.

16. A non-transitory machine-readable medium having instructions stored therein, which when executed by a processor, cause the processor to perform operations for managing data collection in a distributed environment where data for a user is collected in a data aggregator of the distributed environment and the data is collected by a data collector operably connected to the data aggregator via a communication system, the operations comprising:

obtaining, by the data aggregator, an inference difference, the inference difference being based on:

a first inference generated by an aggregator inference model hosted by the data aggregator, the first inference being a first prediction of the data collected by the data collector, and a second inference generated by a twin inference model hosted by the data aggregator, the second inference being a second prediction of the data collected by the data collector, wherein the first inference and the second inference are generated by the data aggregator while the data aggregator has not seen and has not received an actual copy of the data collected by the data collector over the communication system from the data collector;

obtaining, from the data collector, a data difference, the data difference being based on:

the data collected by the data collector, and a reconstructed inference, the reconstructed inference being generated by the data collector;

reconstructing, by the data aggregator, the data collected by the data collector as reconstructed data using the data difference and the first inference generated by the data aggregator, the data aggregator still having not seen and has not received the actual copy of the data over the communication system from the data collector while the data aggregator is reconstructing the reconstructed data; and providing the user with access to use of the reconstructed data, all the while the data aggregator still having not seen and has not received the actual copy of the data over the communication system from the data collector.

17. The non-transitory machine-readable medium of claim 16, wherein the operations further comprise:

providing, to the data collector, a copy of the inference difference prior to obtaining the data difference, wherein the data difference is obtained by the data aggregator prior to the data collector being provided with the first inference and the second inference.

18. The non-transitory machine-readable medium of claim 16, wherein the twin inference model hosted by the data aggregator is a copy of a second twin inference model hosted by the data collector, and the reconstructed inference being based on the inference difference generated by the data aggregator, wherein the inference difference is usable to obtain the first inference based on the second inference to which the data collector has access via the copy of the second twin inference model.

19. A data aggregator, comprising:

a processor; and a memory coupled to the processor to store instructions, which when executed by the processor, cause the processor to perform operations for managing data collection in a distributed environment where data for a user is collected in the data aggregator of the distributed environment and the data is collected by a data collector operably connected to the data aggregator via a communication system, the operations comprising:

obtaining, by the data aggregator, an inference difference, the inference difference being based on:

a first inference generated by an aggregator inference model hosted by the data aggregator, the first inference being a first prediction of the data collected by the data collector, and a second inference generated by a twin inference model hosted by the data aggregator, the second inference being a second prediction of the data collected by the data collector, wherein the first inference and the second inference are generated by the data aggregator while the data aggregator has not seen and has not received an actual copy of the data collected by the data collector over the communication system from the data collector;

obtaining, from the data collector, a data difference, the data difference being based on:

the data collected by the data collector, and a reconstructed inference, the reconstructed inference being generated by the data collector;

reconstructing, by the data aggregator, the data collected by the data collector as reconstructed data using the data difference and the first inference generated by the data aggregator, the data aggregator still having not seen and has not received the actual copy of the data over the communication system from the data collector while the data aggregator is reconstructing the reconstructed data; and providing the user with access to use of the reconstructed data, all the while the data aggregator still having not seen and has not received the actual copy of the data over the communication system from the data collector.

20. The data aggregator of claim 19, wherein the operations further comprise:

providing, to the data collector, a copy of the inference difference prior to obtaining the data difference, wherein the data difference is obtained by the data aggregator prior to the data collector being provided with the first inference and the second inference.

\* \* \* \* \*